United States Patent
Ishida et al.

(10) Patent No.: US 9,943,922 B2
(45) Date of Patent: Apr. 17, 2018

(54) FILLET ARC WELDED JOINT AND METHOD OF FORMING THE SAME

(71) Applicant: NIPPON STEEL & SUMITOMO METAL CORPORATION, Tokyo (JP)

(72) Inventors: Yoshinari Ishida, Tokyo (JP); Shinji Kodama, Tokyo (JP); Shoko Tsuchiya, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 609 days.

(21) Appl. No.: 14/390,917

(22) PCT Filed: Apr. 16, 2013

(86) PCT No.: PCT/JP2013/061335
§ 371 (c)(1),
(2) Date: Oct. 6, 2014

(87) PCT Pub. No.: WO2013/157557
PCT Pub. Date: Oct. 24, 2013

(65) Prior Publication Data
US 2015/0071703 A1     Mar. 12, 2015

(30) Foreign Application Priority Data

Apr. 17, 2012 (JP) .................... 2012-093877
Aug. 17, 2012 (JP) .................... 2012-180870

(51) Int. Cl.
*B23K 9/02* (2006.01)
*B23K 9/025* (2006.01)
(Continued)

(52) U.S. Cl.
CPC ............ *B23K 9/025* (2013.01); *B23K 9/0026* (2013.01); *B23K 9/173* (2013.01); *Y10T 403/478* (2015.01)

(58) Field of Classification Search
CPC ... Y10T 403/478; Y10T 403/479; B23K 9/02; B23K 9/0216; B23K 9/04; B23K 9/042
See application file for complete search history.

(56) References Cited

U.S. PATENT DOCUMENTS

| 1,665,360 A | * | 4/1928 | Hawley | ................... F22B 37/00 |
| | | | | 219/137 R |
| 2,280,150 A | * | 4/1942 | Hasse et al. | ........... B23K 9/035 |
| | | | | 219/137 R |

(Continued)

FOREIGN PATENT DOCUMENTS

| JP | 6-340947 A | 12/1994 |
| JP | 8-19860 A | 1/1996 |

(Continued)

OTHER PUBLICATIONS

Korean Office Action dated Jul. 28, 2015, issued in corresponding Korean Patent Application No. 10-2014-7028716.

(Continued)

*Primary Examiner* — Michael P Ferguson
(74) *Attorney, Agent, or Firm* — Birch, Stewart, Kolasch & Birch, LLP

(57) ABSTRACT

At least one stiffening bead (32) is formed by arc welding on a surface of at least one of metal members in addition to a fillet bead (3) formed by fillet arc welding. The stiffening bead (32) is formed to have an angle of 45° to 135° with respect to the fillet bead (3) and to overlap with the fillet bead (3). The sum total l1 of lengths of stiffening beads (32) can be, for example, 0.5 times or more of a length L of the fillet bead (3).

6 Claims, 10 Drawing Sheets

(51) Int. Cl.
B23K 9/173 (2006.01)
B23K 9/00 (2006.01)

(56) References Cited

U.S. PATENT DOCUMENTS

| | | | |
|---|---|---|---|
| 4,049,186 A * | 9/1977 | Hanneman | B23K 9/0216 |
| | | | 219/137 WM |
| 5,233,149 A * | 8/1993 | Killian | B23K 33/00 |
| | | | 219/137 R |
| 2005/0252888 A1 | 11/2005 | Ohta et al. | |

FOREIGN PATENT DOCUMENTS

| | | |
|---|---|---|
| JP | 9-39829 A | 2/1997 |
| JP | 9-253843 A | 9/1997 |
| JP | 2000-197969 A | 7/2000 |
| JP | 2002-263836 A | 9/2002 |
| JP | 2006-75874 A | 3/2006 |
| JP | 2008-50807 A | 3/2008 |
| JP | 2012-110943 A | 6/2012 |
| KR | 10-2005-0073452 A | 7/2005 |

OTHER PUBLICATIONS

International Preliminary Report on Patentability dated Oct. 30, 2014, issued in PCT/JP2013/061335 (Forms PCT/IB/338, PCT/IB/373 and PCT/ISA/237).
International Search Report, dated Jul. 16, 2013, issued in PCT/JP2013/061335.
Written Opinion of the International Searching Authority, dated Jul. 16, 2013, issued in PCT/JP2013/061335.

* cited by examiner

FILLET ARC WELDED JOINT AND METHOD OF FORMING THE SAME

TECHNICAL FIELD

The present invention relates to a fillet arc welded joint and a method for forming the same, and is preferred to be used particularly for fillet arc welding plural metal members.

BACKGROUND ART

In the automotive field for example, improvement in collision safety is demanded together with improvement in fuel consumption by weight reduction of vehicle bodies for environmental conservation. Thus, use of high-strength steel plates for thickness reduction and optimization of vehicle body structures have been practiced hitherto in various ways, so as to achieve weight reduction of vehicle bodies and improvement in collision safety.

Fatigue strength is also demanded in the high-strength steel plates for weight reduction of vehicle bodies. In general, the fatigue strength of a parent material increases in proportion to steel plate strength, but it is known that the fatigue strength of a welded joint barely increases even when the steel plate strength is increased. This hinders the weight reduction of vehicle bodies by use of the high-strength steel plates.

In particular, underbody members such as suspension arms and sub-frames are difficult to be reduced in weight because the fatigue strength of welded portions will be a problem. In general, fillet arc welding is used for welding such underbody members, and thus increasing the fatigue strength of fillet arc welded joints will be an issue. Hereinafter, the "fillet arc welded joint" will be described as "fillet welded joint" as necessary.

To address such an issue, based on knowledge that the fatigue strength of the lap fillet welded joint is related to the radius of curvature of a toe portion and this radius of curvature depends on chemical components of welded metal, Patent Literature 1 discloses a method to increase the radius of curvature of a toe portion by optimizing chemical components of the welded metal, so as to reduce stress concentration and improve the fatigue strength.

However, the method disclosed in Patent Literature 1 does not have an effect to reduce stress concentration to a root portion. Further, when the stress concentration to the toe portion decreases, stress concentration to the root portion relatively becomes obvious, and a fatigue failure may occur with the root portion being a starting point.

Patent Literature 2 discloses a weld bead structure in which an end face of another steel plate is butted against one surface of a steel plate, a fillet bead is formed on both sides of the butted portion, and moreover, this weld bead is extended.

The weld bead structure disclosed in Patent Literature 2 is to alleviate stress concentration to a toe portion by keeping the toe portion away from the end portion of another steel plate. However, there is no effect to reduce stress concentration in the root portion. Moreover, in the lap fillet welded joint, there is almost no stress concentration reducing effect in the toe portion, and it is not possible to effectively suppress occurrence of fatigue failure.

Further, Patent Literature 3 suggests a technique to reduce residual stress and stress concentration in the welded portion and to increase the fatigue strength by performing fillet welding of a main plate and a rib plate in boxing welding of the rib plate, cooling them thereafter to room temperature, and disposing a linear weld on an end portion of the rib plate to be longer than the "rib plate thickness+2×fillet welding leg length" by a length equal to or more than "2×fillet welding leg length".

However, the technique described in Patent Literature 3 is targeted at a steel material which is a thick plate of 15 mm to 25 mm, and cannot be applied to a welded portion of a thin steel plate of approximately 3.6 mm or less, which is used for underbody members or the like of automobiles. Specifically, in a T-shaped joint of thin plate, in view of welding efficiency, fillet welding from both sides of a vertical plate (plate corresponding to a rib plate) is rarely performed. Further, when welding of an end portion of a thin plate is performed like boxing, the end portion of the vertical plate welded portion melts down due to heat input at the time of welding, and an undercut defect occurs.

Furthermore, with respect to the residual stress in the welded portion which is the problem in Patent Literature 3, the residual stress in the welded portion increases by constraints of the parent material itself in a welded portion of the thick plate. Meanwhile, in welding of a thin plate, the residual stress is relatively small since the plate can easily deform out of plane. On the other hand, since out-of-plane deformation easily occurs in a thin-plate welded member, the welded portion is twisted when a tensile load is inputted, and stress concentration may increase not only in the weld toe portion but also in the root portion, which makes it necessary to consider a technique to suppress a crack occurring from the both.

As described above, in joint forms such as the lap fillet welded joint and the one-side fillet arc welded joint, if a load which can cause opening of the root portion is applied, the degree of concentration of stress may become larger in the root portion than in the toe portion. However, there has been proposed no technique to reduce the stress concentration to the root portion and effectively suppress occurrence of fatigue failure with the root portion being a starting point.

CITATION LIST

Patent Literature

Patent Literature 1: Japanese Laid-open Patent Publication No. 06-340947

Patent Literature 2: Japanese Laid-open Patent Publication No. 09-253843

Patent Literature 3: Japanese Laid-open Patent Publication No. 08-19860

SUMMARY OF INVENTION

Technical Problem

The present invention is made in view of the above-described situation, and it is an object thereof to suppress occurrence of fatigue failure with one or both of a toe portion and a root portion being a starting point in a fillet arc welded joint of metal members.

Solution to Problem

The present inventors intensively studied methods for solving the above-described problem. As a result, it has been found that fatigue strength of a welded joint improves significantly by forming, with a fillet bead being a starting point, at least one bead in addition to the fillet bead to have a required angle in the same plane as the fillet bead on a surface of at least one of metal members in a welded joint formed by fillet arc welding a metal member and a metal member.

The present invention is made based on the above knowledge, and the gist thereof is as follows.

A fillet arc welded joint of the present invention is a fillet arc welded joint formed by fillet arc welding a metal member and a metal member, the fillet arc welded joint including:

at least one stiffening bead formed by arc welding on a surface of at least one of the metal members in addition to a fillet bead formed by the fillet arc welding, wherein the stiffening bead is formed to have an angle of 45° to 135° with respect to the fillet bead and to overlap with the fillet bead, and is formed to satisfy conditions (a1), (b), and (c) below.

$$\text{Sum total } l \text{ of lengths of stiffening beads} \geq L \times 0.5 \quad \text{(a1)}$$

$$\text{Height } h \text{ of the stiffening beads} \geq t/2 \quad \text{(b)}$$

$$\text{Width } w \text{ of the stiffening beads} \geq 2.5t \quad \text{(c)}$$

L: Length (mm) of the fillet bead t: Thickness (mm) of the metal member on which the stiffening bead is formed Further, another example of the fillet arc welded joint of the present invention is a fillet arc welded joint formed by fillet arc welding a metal member and a metal member, the fillet arc welded joint including:

at least one stiffening bead formed by arc welding on a surface of at least one of the metal members in addition to a fillet bead formed by the fillet arc welding, wherein the stiffening bead is formed to have an angle of 45° to 135° with respect to the fillet bead and to overlap with the fillet bead within a range from a position of at least one of a start edge and an end edge of the fillet bead to a position separated therefrom by ¼ of a length of the fillet bead along a direction in which the fillet bead is formed, and is formed to satisfy conditions (a2), (b), and (c) below.

$$\text{Length } l \text{ of one stiffening bead} \geq \max\{2 \times Wf, D\} \quad \text{(a2)}$$

$$\text{Height } h \text{ of the stiffening bead} \geq t/2 \quad \text{(b)}$$

$$\text{Width } w \text{ of the stiffening bead} \geq 2.5t \quad \text{(c)}$$

Wf: Width (mm) of the fillet bead

D: Distance (mm) between the stiffening bead and a position of an edge closer to this stiffening bead out of positions of the start edge and the end edge of the fillet bead max{2×Wf, D}: Larger value out of 2×Wf and D L: Length (mm) of the fillet bead t: Thickness (mm) of the metal member on which the stiffening bead is formed Further, a number n of the stiffening beads formed with respect to the fillet beads may satisfy a condition (d) below.

$$L/n \leq 50t \quad \text{(d)}$$

L: Bead length (mm) of the fillet beads t: Thickness (mm) of the metal member on which the stiffening bead is formed Further, the stiffening bead may be formed on a surface of one of the metal members with the fillet bead being a starting point.

Further, the stiffening bead may be formed on surfaces of both the metal members across the fillet bead.

Further, the welded joint may be a welded joint formed by overlapping a metal member and a metal member and fillet arc welding the metal members.

Further, in a first aspect and a second aspect of the fillet arc welded joint, the welded joint may be a welded joint formed by placing an end portion of a metal member on a surface of a metal member and fillet arc welding the end portion and the surface.

Further, a method for forming a fillet arc welded joint is a method for forming a fillet arc welded joint by fillet arc welding a metal member and a metal member, the method including:

upon forming a fillet bead by the fillet arc welding and forming at least one stiffening bead by arc welding in addition to the fillet arc welding on a surface of at least one of the metal members, forming the stiffening bead to have an angle of 45° to 135° with respect to the fillet bead and to overlap with the fillet bead, and to satisfy conditions (a1), (b), and (c) below.

$$\text{Sum total } l \text{ of lengths of stiffening beads} \geq L \times 0.5 \quad \text{(a1)}$$

$$\text{Height } h \text{ of the stiffening beads} \geq t/2 \quad \text{(b)}$$

$$\text{Width } w \text{ of the stiffening beads} \geq 2.5t \quad \text{(c)}$$

L: Length (mm) of the fillet bead t: Thickness (mm) of the metal member on which the stiffening bead is formed.

Further, another example of the method for forming a fillet arc welded joint is a method for forming a fillet arc welded joint by fillet arc welding a metal member and a metal member, the method including:

upon forming a fillet bead by the fillet arc welding and forming at least one stiffening bead by arc welding in addition to the fillet arc welding on a surface of at least one of the metal members, forming the stiffening bead to have an angle of 45° to 135° with respect to the fillet bead and to overlap with the fillet bead within a range from a position of at least one of a start edge and an end edge of the fillet bead to a position separated therefrom by ¼ of a length of the fillet bead along a direction in which the fillet bead is formed, and to satisfy conditions (a2), (b), and (c) below.

$$\text{Length } l \text{ of one stiffening bead} \geq \max\{2 \times Wf, D\} \quad \text{(a2)}$$

$$\text{Height } h \text{ of the stiffening bead} \geq t/2 \quad \text{(b)}$$

$$\text{Width } w \text{ of the stiffening bead} \geq 2.5t \quad \text{(c)}$$

Wf: Width (mm) of the fillet bead

D: Distance (mm) between the stiffening bead and a position of an edge closer to this stiffening bead out of positions of the start edge and the end edge of the fillet bead max{2×Wf, D}: Larger value out of 2×Wf and D L: Length (mm) of the fillet bead t: Thickness (mm) of the metal member on which the stiffening bead is formed.

Further, a plurality of stiffening beads may be formed so that a number n of the stiffening beads with respect to the fillet beads may satisfy a condition (d) below.

$$L/n \leq 50t \quad \text{(d)}$$

L: Length (mm) of the fillet beads t: Thickness (mm) of the metal member on which the stiffening bead is formed Further, the stiffening bead may be formed on a surface of one of the metal members with the fillet bead being a starting point.

Further, the stiffening bead may be formed on surfaces of both the metal members across the fillet bead.

Further, the welded joint may be a welded joint formed by overlapping a metal member and a metal member and fillet arc welding the metal members.

Further, the welded joint may be a welded joint formed by placing an end portion of a metal member on a surface of a metal member and fillet arc welding the end portion and the surface.

Advantageous Effects of Invention

According to the present invention, a fatigue failure occurring from one or both of a toe portion and a root portion of a welded joint obtained by fillet arc welding metal members can be suppressed significantly, and thus a fillet arc welded joint excelling in fatigue characteristics can be formed.

DESCRIPTION OF EMBODIMENTS

Embodiments of a welded joint of the present invention and a method for forming the same will be described in detail using the drawings.

[Description of Basic Principles]

Figure 1:
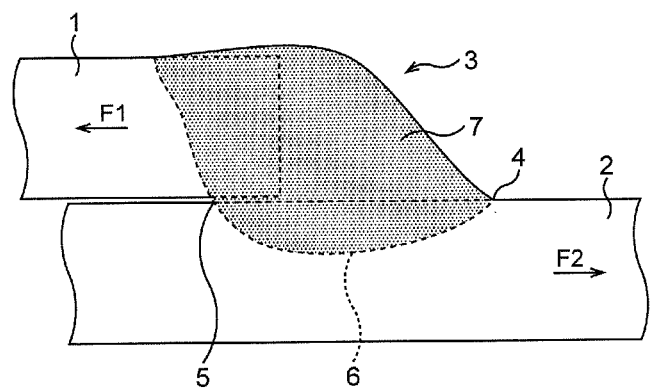
FIG. 1 is a view illustrating a cross-sectional shape of a lap fillet welded joint.

FIG. 1 illustrates an example of a cross-sectional shape of a lap fillet welded joint. By arc welding using a welding wire the space between an end portion of an upper steel plate 1 and a surface of a lower steel plate 2 as illustrated in FIG. 1, the end portion of the upper steel plate 1 and a surface portion of the lower steel plate 2 melt to a welding boundary 6, solidify, and form a fillet bead 3. Note that the portion where the steel plate and the welding wire melted and solidified is called a welded metal 7. Further, unless noted otherwise, the surface refers to the face of a side where a weld bead of a steel plate is to be formed, or the face of a side where a weld bead of a steel plate is formed.

In the lap fillet welded joint in which one end of a steel plate overlapped portion is fillet arc welded as illustrated in FIG. 1, when a tensile force F1 operates along the upper steel plate 1 on the fillet bead 3 formed by fillet arc welding and a tensile force F2 operates along the lower steel plate 2, a large bending moment occurs by a displacement between a center axis of the upper steel plate 1 and a center axis of the lower steel plate 2.

Thus, there occurs a deformation in a mode such that the upper steel plate 1 warps downward, and the lower steel plate 2 warps upward, and a large stress concentration occurs in a toe portion 4 and a root portion 5. Due to this stress concentration, a fatigue crack occurs from the toe portion 4 or the root portion 5. The fatigue crack proceeds perpendicular to an approximate load direction, and the welded joint breaks. This is not limited to the lap fillet welded joint illustrated in FIG. 1 but can occur in any other fillet welded joint. Note that in the example illustrated in FIG. 1, the toe portion 4 refers to a boundary between the lower steel plate 2 and the fillet bead 3, and the root portion 5 refers to a boundary between the upper steel plate 1 or the lower steel plate 2 and the welded metal 7.

Figure 2:
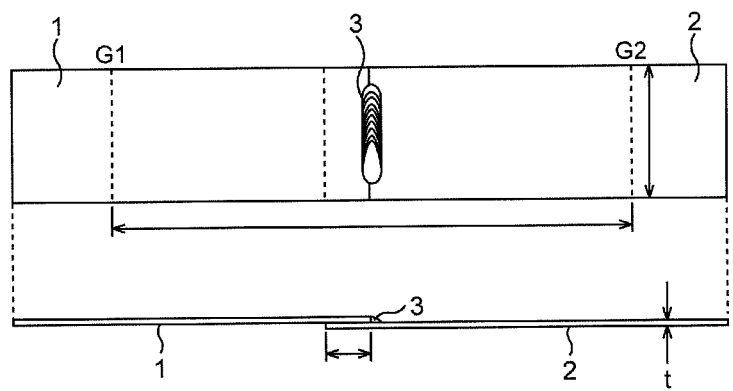
FIG. 2 is a view illustrating a test piece on which the lap fillet welded joint is formed.

Accordingly, first, in order to analyze a deformation behavior of the fillet arc welded joint, two steel plates having a plate width of 60 mm were overlapped with an overlapped portion of 20 mm, and the overlapped portion was arc welded, thereby preparing a test piece having a fillet bead having a length of just over 40 mm in the overlapped portion as illustrated in FIG. 2. A tensile test was carried out on this test piece. A deformation mode of the test piece when a tensile force operates on the welded joint was then analyzed by a three-dimensional finite element method. Note that an upper view of FIG. 2 is a plan view of the test piece, and a lower view of FIG. 2 is a side view of the test piece. G1 and G2 illustrated in the upper view of FIG. 2 denote a held position during the test.

Figure 3:
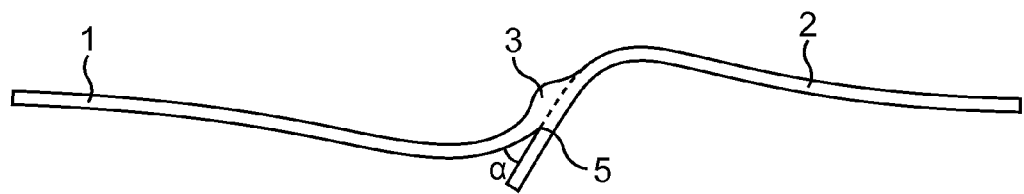
FIG. 3 is a view schematically illustrating a deformation mode of the test piece of the lap fillet welded joint.

FIG. 3 schematically illustrates a deformation mode of the test piece. When the tensile force operates to the welded joint, as illustrated in FIG. 3, the lower steel plate 2 bends largely in the vicinity of the fillet bead 3, and the root portion 5 opens largely at an opening angle α. Further, as a result of analyzing the behavior of the deformation of the test piece by the three-dimensional finite element method, presence of a large stress concentrating position in the vicinity of the root portion 5 was recognized.

From this result, it is conceivable that the large bending of the lower steel plate 2 in the vicinity of the fillet bead 3 and the large opening of the root portion 5 increase the stress concentration to the root portion 5 and cause occurrence of the fatigue crack. Next, means for suppressing the bending of the lower steel plate 2 were considered.

As a result of study, the present inventors conceived that when an additional arc weld bead (stiffening bead) is formed by performing bead-on welding with the fillet bead 3 being a starting point in a direction intersecting the fillet bead 3, this stiffening bead would be able to function as a member which increases stiffness of the steel plate to suppress bending of the lower steel plate 2, and suppress occurrence of the fatigue crack.

Figure 4:
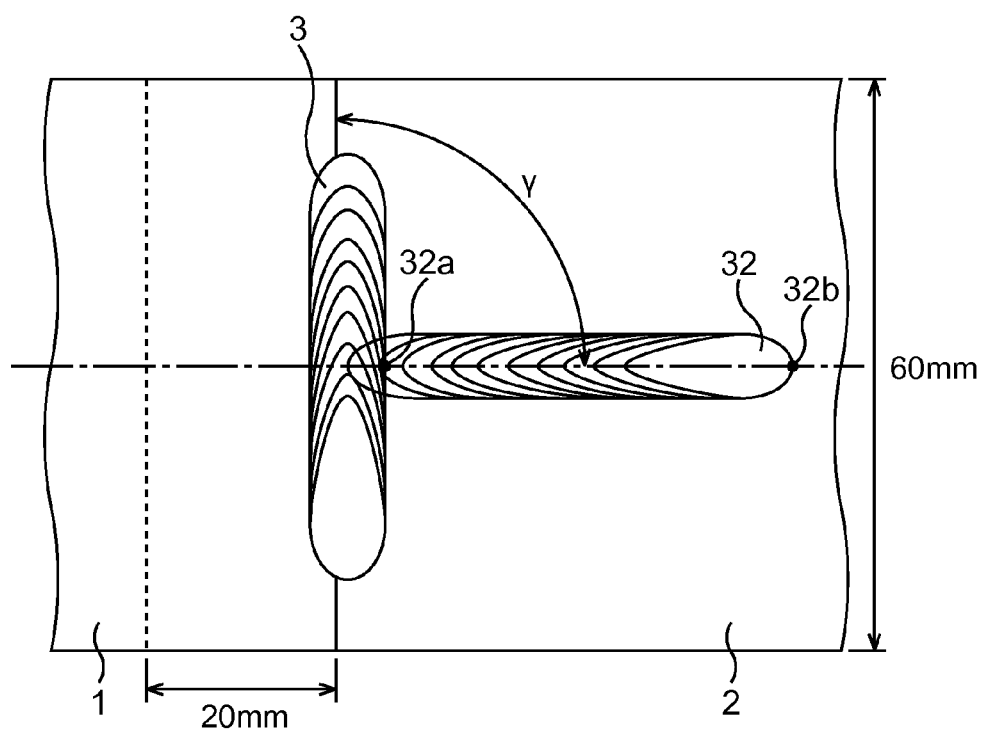
FIG. 4 is a view illustrating a test piece on which a stiffening bead is formed substantially perpendicular to a fillet bead with a fillet bead surface being a starting point.

In order to confirm the effectiveness of this, the present inventors further formed a stiffening bead 32 by performing bead-on welding in the test piece illustrated in FIG. 2 so that a moving distance of a welding torch tip is 40 mm in a direction substantially perpendicular to the fillet bead 3 with the surface of the fillet bead 3 being a starting point. The shape of the test piece fabricated in this manner is illustrated in FIG. 4.

Next, the tensile test was carried out on this test piece, and the behavior of deformation of the test piece was analyzed by the three-dimensional finite element method.

Figure 5:
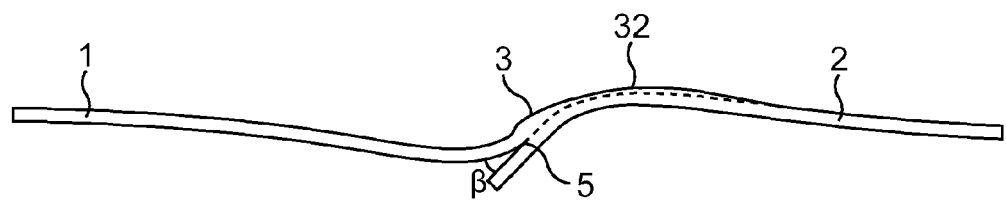
FIG. 5 is a view schematically illustrating a deformation mode of the test piece on which the stiffening bead is formed substantially perpendicular to the fillet bead.

FIG. 5 schematically illustrates a deformation mode of the test piece on which the stiffening bead 32 is formed substantially perpendicular to the fillet bead 3.

Comparing the test piece illustrated in FIG. 5 and the test piece illustrated in FIG. 3, it can be seen that the bending in the vicinity of the fillet bead 3 of the lower steel plate 2 is smaller in the test piece illustrated in FIG. 5 in which the stiffening bead 32 is formed than in the test piece illustrated in FIG. 3 in which the stiffening bead 32 is not formed. Further, it can be seen that an opening angle β of the root portion 5 illustrated in FIG. 5 is smaller than the opening angle α of the root portion 5 illustrated in FIG. 3.

From this, it was confirmed that when the stiffening bead 32 is formed substantially perpendicular to the fillet bead 3 (see FIG. 4), the stiffening bead 32 strongly exhibits an operation to increase stiffness of the steel plate, and bending of the lower steel plate 2 is suppressed.

Moreover, as a result of an analysis by the three-dimensional finite element method with respect to the root portion 5, it was confirmed that the degree of stress concentration in the vicinity of the root portion 5 illustrated in FIG. 5 is smaller than the degree of stress concentration in the vicinity of the root portion 5 illustrated in FIG. 3.

To further confirm such effects of the stiffening bead 32, the present inventors quantitatively analyzed the function of the stiffening bead 32.

An analytic model of the test piece illustrated in FIG. 2 and an analytic model of the test piece illustrated in FIG. 4 were prepared, and the degree of stress concentration in the root portion 5 of each of the analytic models was calculated by the three-dimensional finite element method. Note that the test piece illustrated in FIG. 2 is a test piece on which no stiffening bead is disposed and is a test piece corresponding to a test piece symbol "TP2" in Table 2 and Table 3 of examples, which will be described later. Further, the test piece illustrated in FIG. 4 is a test piece on which stiffening beads are disposed, and is a test piece corresponding to the test piece symbol "TP10" in Table 2 and Table 3.

Figure 6:
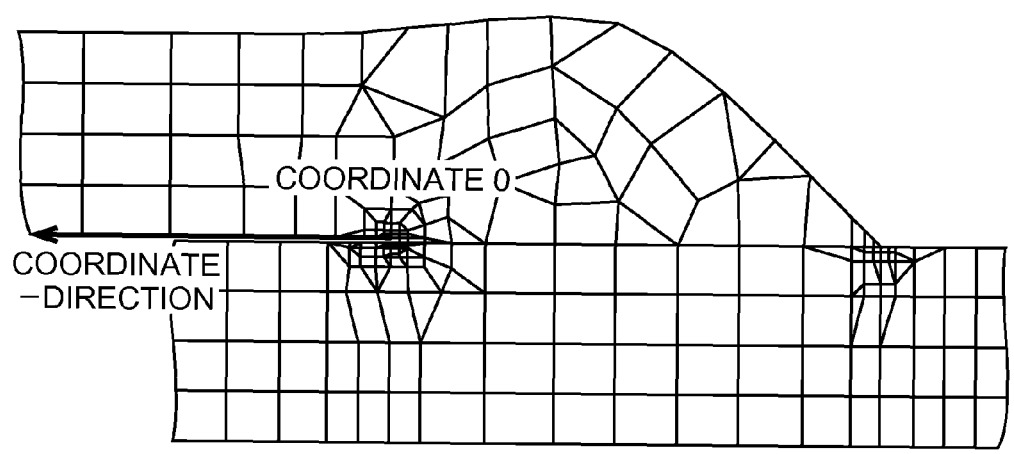
FIG. 6 is a diagram illustrating an element dividing mode in the vicinity of a bead at the time of the analysis by a three-dimensional finite element method and a set mode of positions and coordinates where a comparison of stress concentration coefficients was made.

FIG. 6 illustrates an element dividing mode in the vicinity of a weld bead at the time of the analysis by the three-dimensional finite element method performed for confirming effects of the stiffening beads and a set mode of positions and coordinates where a comparison of stress concentration coefficients was made. As illustrated in FIG. 6, the coordinates are taken leftward (one direction) with a front end of the root portion 5 being coordinate 0.

Figure 7:
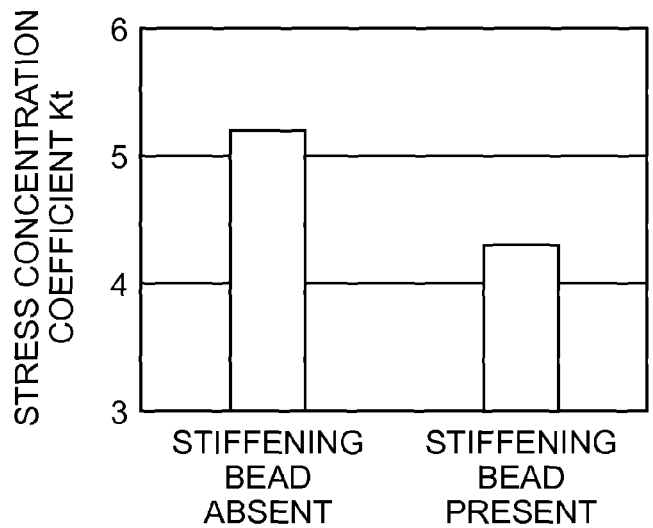
FIG. 7 is a diagram illustrating results of analyzing a stress concentration coefficient.

FIG. 7 illustrates results of analyzing a maximum stress concentration coefficient Kt on the surface of a rear side of the upper steel plate 1 in the vicinity of the front end (coordinate 0) of the root portion 5 in each of the case where no stiffening bead 32 is disposed and the case where the stiffening beads 32 of 43 mm are disposed. In the following description, the stress concentration coefficient Kt is a value obtained by dividing the value of the maximum principal stress on the upper steel plate 1 in the vicinity of the front end (coordinate 0) of the root portion 5 illustrated in FIG. 6 by an average tensile principal stress applied to a front end of the steel plate.

When there is no stiffening bead 32, the stress concentration coefficient Kt was 5.3, but the stress concentration coefficient Kt decreased to 4.3 by disposing the stiffening bead 32. Although the stiffening bead 32 was disposed only on the lower steel plate 2, it can be seen that the effect of reducing the stress concentration coefficient Kt can be obtained also for the root portion 5.

It can be said that this contributes largely to suppression of occurrence of the fatigue crack with the root portion 5 being a starting point.

The present inventors then prepared test pieces by varying plate thicknesses of steel plates and lengths of the stiffening bead 32 for another stiffening bead, and studied the relation between the plate thicknesses of steel plates and the lengths of the stiffening bead 32 and a fatigue life (times).

Figure 8:
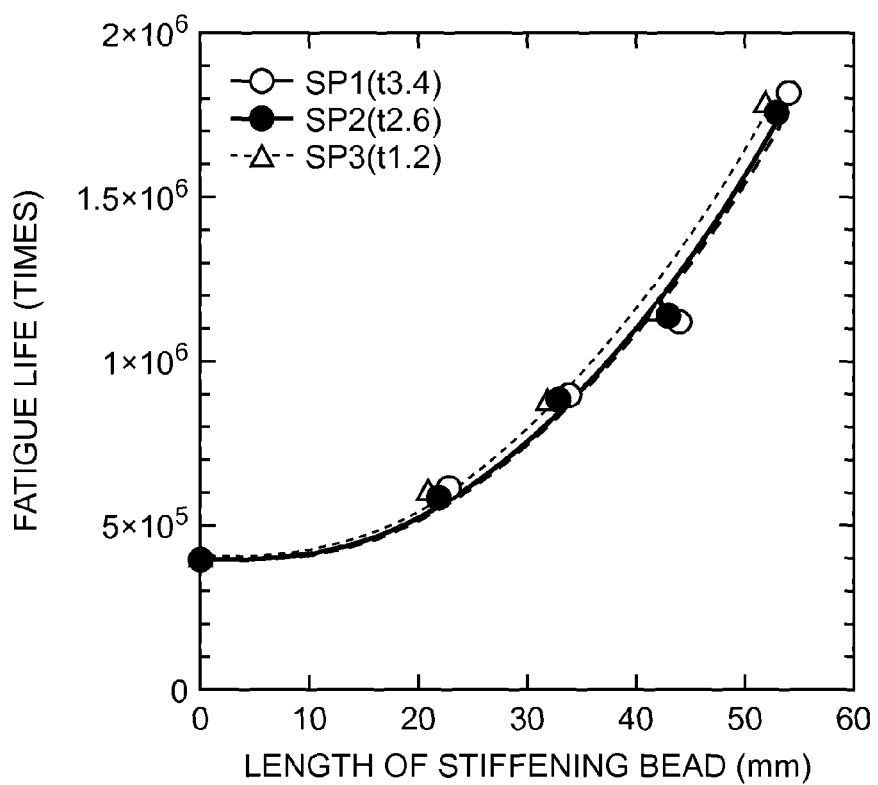
FIG. 8 is a diagram illustrating the relation of lengths of stiffening beads and a fatigue life.

As an example of study results, FIG. 8 illustrates results of test piece symbols "TP1" to "TP15" illustrated in Table 2 and Table 3, which are organized by the relation of the lengths of the stiffening beads and the fatigue life, out of fatigue tests carried out according to conditions which will be described later.

As illustrated in FIG. 8, when the length of the stiffening bead is more than 20 mm, the fatigue life (times) improves largely (1.5 times or more).

From the above results, when the stiffening bead is formed substantially perpendicular to the fillet bead, the stiffening bead strongly exhibits an operation to increase stiffness of the steel plate. Thus, bending of the lower steel plate is suppressed, and as a result, occurrence of the fatigue crack is suppressed significantly.

[Description of Individual Requirements]

From the analysis and experiment as above, it was confirmed that the fatigue strength improves when the stiffening bead 32 is formed. Thus, necessary conditions for the stiffening bead 32 were studied next. Results of this study will be described below.

(Mode of Disposition of the Stiffening Bead)

The stiffening bead 32 needs to be formed to have an overlapped portion with the fillet bead 3. When it is formed separately from the fillet bead, the stiffening bead does not sufficiently function as a member to enhance stiffness of the steel plate. Accordingly, it is necessary to be either in the mode of forming the stiffening bead 32 with the fillet bead 3 being a starting point (that is, placing a weld start point in the fillet bead 3) or in the mode of forming the stiffening bead 32 across the fillet bead 3.

To dispose the stiffening bead 32 to have an overlapped portion with the fillet bead 3, various modes are possible. Note that the case will be described below where the fillet bead 3 is disposed first, and the stiffening bead 32 is disposed to overlap with the fillet bead. However, the same modes as the modes described below can be employed when the stiffening bead 32 is disposed first and then the fillet bead 3 is disposed to overlap with the stiffening bead.

First, a mode of disposition in the case where the stiffening bead 32 is formed on the lap fillet welded joint will be described.

(I) Forming on a Steel Plate on One Side (One-Side Bead).

As explained in the description of basic principles, the stiffening bead 32 is disposed on the lower steel plate 2 with the fillet bead 3 being a start point and in a direction crossing the fillet bead 3. In the following description, the stiffening bead disposed in this manner will be described as a one-side bead as necessary. Further, when referring to the one-side bead as the stiffening bead 32, it will be described as a one-side bead 32A as necessary (see FIG. 9A, FIG. 9D, FIG. 9F, FIG. 9H, and the like).

Here, the length of the fillet bead 3 is L. The length L of the fillet bead 3 is a length of a melting end on both sides of the fillet bead 3. When the stiffening bead 32 is the one-side bead 32A and disposed at one position, it is effective to dispose the one-side bead 32A in the range between a position separated by the length of (¼)L from one melting end of the fillet bead 3 along a direction in which the fillet bead 3 is formed and a position separated by the length of (¾)L from one melting end of the fillet bead 3 along the direction in which the fillet bead 3 is formed. Further, forming the one-side bead 32A with the fillet bead 3 side being a starting point is larger in improving effect of fatigue strength than forming the one-side bead 32A with the steel plate side being a starting point. This is because the start edge portion of a weld bead in arc welding becomes a projecting shape where stress concentration occurs, whereas the end edge portion becomes a flat shape where stress concentration decreases.

(II) Forming on Steel Plates on Both Sides Across the Fillet Bead 3 (Cross Bead).

In the description of the basic principles, the mechanism of improving fatigue strength in the case where the stiffening bead 32 is disposed on the lower steel plate 2 with the lap fillet bead 3 being a starting point is described. However, disposing the stiffening bead 32 on both the upper steel plate 1 and the lower steel plate 2 across the fillet bead 3 enables further improvement in fatigue strength. Therefore, the stiffening bead 32 may be disposed in this manner. In the following description, a stiffening bead disposed in this manner will be described as a cross bead as necessary. Further, when referring to the cross bead as the stiffening bead 32, it will be described as a cross bead 32B as necessary (see FIG. 9B, FIG. 9C, FIG. 9G, and so on). Further, when referring to the one-side bead 32A and the cross bead 32B generically, they will be described as a stiffening bead 32.

The mechanism of improving fatigue strength is to suppress bending in the vicinity of the fillet bead 3 as described above. In the cross bead 32B, since the stiffening bead is disposed on the upper steel plate 1, the deformation suppressing effect of the upper steel plate 1 can be improved, and the opening angle α of the root portion 5 can be made small.

Note that as indicated by the analysis results of deformation of test pieces in FIG. 4, a compression stress operates on the surface of the upper steel plate 1, and a tensile stress operates on the surface of the lower steel plate 2. Accordingly, in the case where the stiffening bead is disposed across the fillet bead 3 (that is, the cross bead 32B is disposed), desirably, the welding start position is the upper steel plate 1 and the welding end position is the lower steel plate 2, to thereby decrease the stress concentration coefficient of a tensile stress portion of the lower steel plate 2. Further, when this cross bead 32B is disposed at one position, similarly to the one-side bead 32A, it is effective to dispose the cross bead 32B in the range between a position separated by the length of (¼)L from one melting end of the fillet bead 3 along the direction in which the fillet bead 3 is formed and a position separated by the length of (¾)L from one melting end of the fillet bead 3 along the direction in which the fillet bead 3 is formed.

(III) Forming a Plurality of Stiffening Beads (Multiple Beads).

It is not necessary for the stiffening bead 32 to be at one position, and fatigue strength improves also by disposing a plurality of stiffening beads. When the plurality of stiffening beads are disposed, one-side beads 32A and cross beads 32B may be disposed independently, or one-side beads 32A and cross beads 32B may be disposed in mixture.

Disposed positions of the case where the plurality of one-side beads 32A or cross beads 32B are disposed may be both end portions of the fillet bead 3.

Examples of dispositions of the stiffening beads 32 will be described in FIG. 9.

Figure 9A:
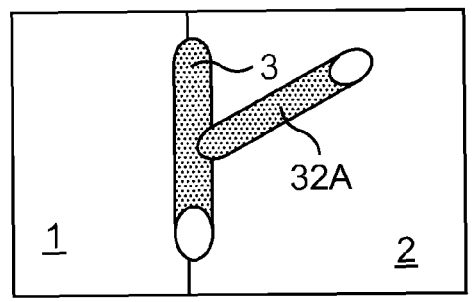
FIG. 9A is a view illustrating a first example of a disposition mode different from FIG. 4 of the stiffening bead on the lap fillet welded joint.
Figure 9B:
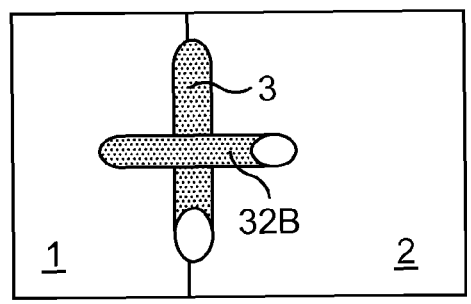
FIG. 9B is a view illustrating a second example of a disposition mode different from FIG. 4 of the stiffening bead on the lap fillet welded joint.
Figure 9C:
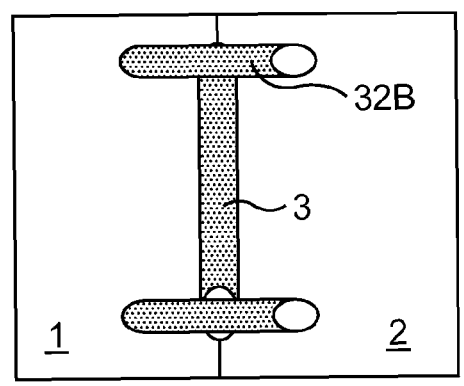
FIG. 9C is a view illustrating a third example of a disposition mode different from FIG. 4 of the stiffening bead on the lap fillet welded joint.
Figure 9D:
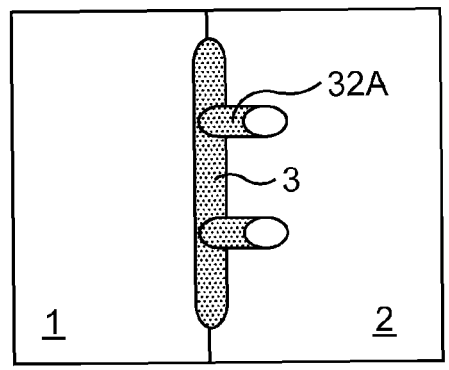
FIG. 9D is a view illustrating a fourth example of a disposition mode different from FIG. 4 of the stiffening bead on the lap fillet welded joint.
Figure 9E:
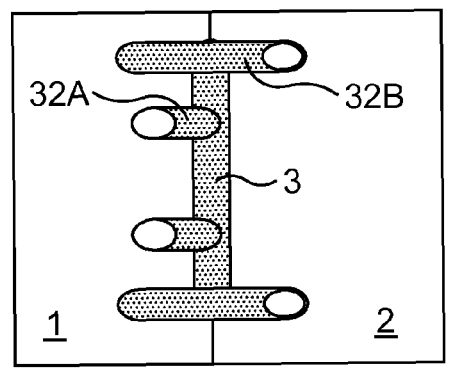
FIG. 9E is a view illustrating a fifth example of a disposition mode different from FIG. 4 of the stiffening bead on the lap fillet welded joint.
Figure 9F:
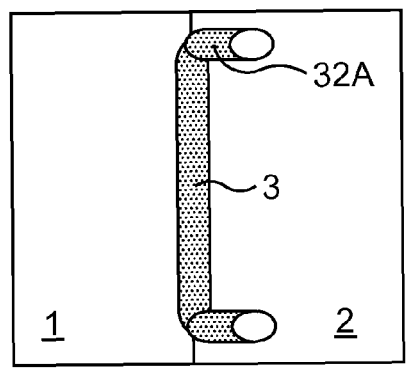
FIG. 9F is a view illustrating a sixth example of a disposition mode different from FIG. 4 of the stiffening bead on the lap fillet welded joint.
Figure 9G:
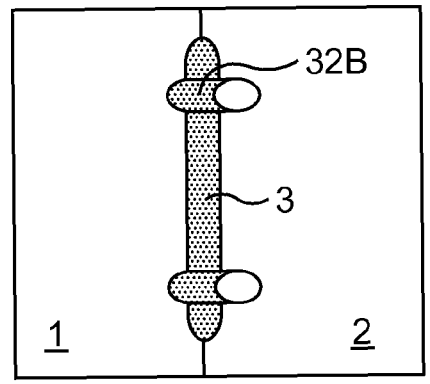
FIG. 9G is a view illustrating a seventh example of a disposition mode different from FIG. 4 of the stiffening bead on the lap fillet welded joint.
Figure 9H:
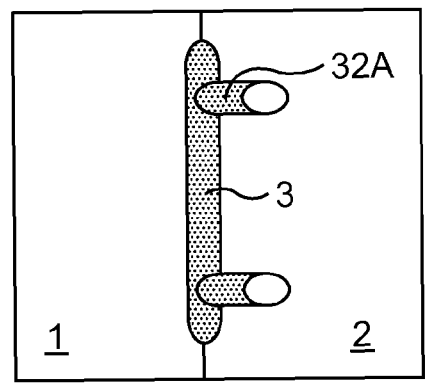
FIG. 9H is a view illustrating an eighth example of a disposition mode different from FIG. 4 of the stiffening bead on the lap fillet welded joint.
Figure 9I:
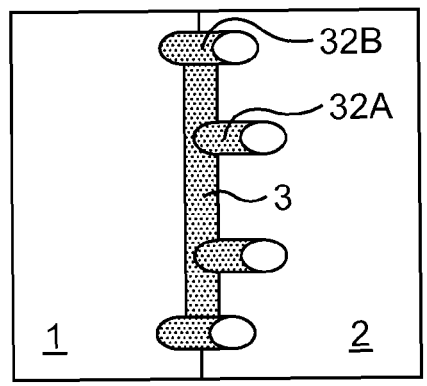
FIG. 9I is a view illustrating a ninth example of a disposition mode different from FIG. 4 of the stiffening bead on the lap fillet welded joint.

FIG. 9A is an example of a one-side bead 32A disposed obliquely with respect to the fillet bead 3 from the vicinity of a center portion of the fillet bead 3. FIG. 9B is an example of the cross bead 32B disposed in the vicinity of a center portion of the fillet bead 3. FIG. 9C is an example of two cross beads 32B disposed on both end portions of the fillet bead 3 respectively. FIG. 9D is an example of one-side beads 32A disposed to have an interval at positions near the center portion of the fillet bead 3. FIG. 9E is an example of two cross beads 32B disposed on both end portions of the fillet bead 3 respectively and two one-side beads 32A disposed on the upper steel plate 1 side to have an interval at positions near the center portion of the fillet bead 3. FIG. 9F is an example two one-side beads 32A disposed on both end portions of the fillet bead 3, respectively. FIG. 9G is an example of two cross beads 32B disposed at positions near both end portions of the fillet bead 3, respectively. FIG. 9H is an example of two one-side beads 32A disposed at positions near both end portions of the fillet bead 3, respectively. FIG. 9I is an example of two cross beads 32B disposed on both end portions of the fillet bead 3, respectively, and two one-side beads 32A disposed on the lower steel plate 2 side to have an interval at positions near the center portion of the fillet bead 3.

(IV) Fillet Welded Joint Having a T-Shaped Cross Section (T Joint)

Next, the case of forming a stiffening bead on a fillet welded joint will be described, the joint being obtained by mounting an end portion of a steel member on a surface of a steel member to form a joint having a T-shaped cross section, and arc welding a corner thereof.

Depending on the shape of a steel member, there may be cases where only one corner of the fillet welded joint having a T-shaped cross section can be welded. Such a fillet welded joint in which only one side is fillet welded can be treated similarly to the lap fillet welded joint.

Figure 10:
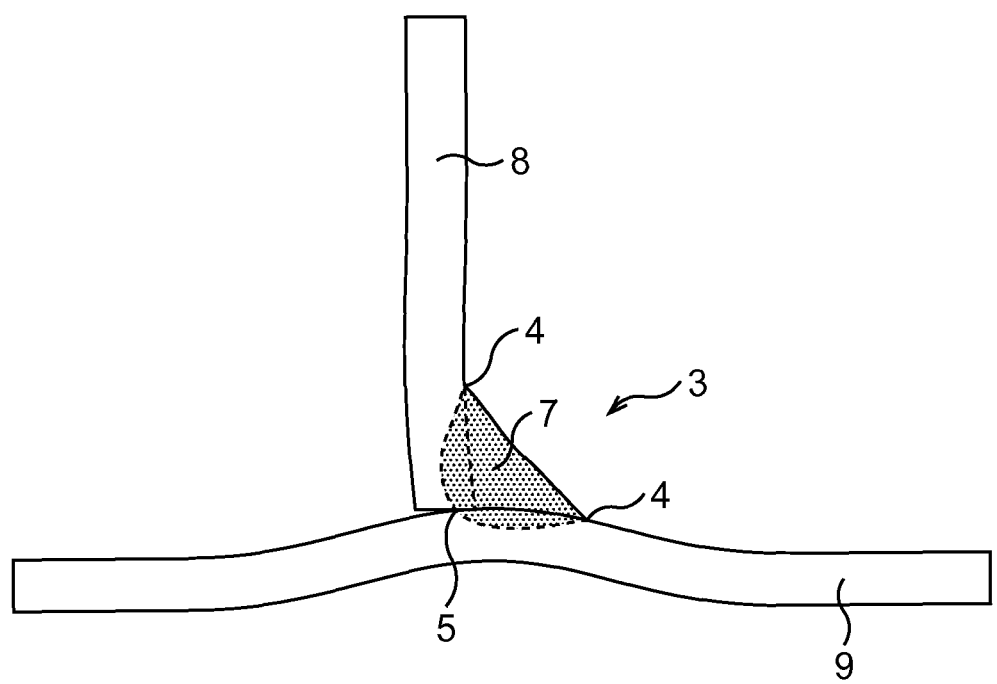
FIG. 10 is a view schematically illustrating a deformation form of a test piece of a fillet welded joint having a T-shaped cross section.

When a thin steel plate having a plate thickness of 3.6 mm or less is used, deformation of the steel plate affects the fatigue life of a welded portion in the fillet welded joint having a T-shaped cross section. FIG. 10 schematically illustrates a deformation form of a test piece when a tensile load is inputted to a vertical steel plate 8 of the fillet welded joint having a T-shaped cross section. The load inputted to the vertical steel plate 8 is transmitted to a horizontal steel plate 9 through the welded metal 7 (fillet welded portion). Accordingly, the weld toe portion 4 on the vertical steel plate 8 side deforms as if it is pulled to the fillet bead 3 side. Further, the weld toe portion 4 on the horizontal steel plate 9 side deforms as if it is pulled upward. In addition, the root portion 5 deforms as if it is torn apart. Accordingly, also in the fillet welded joint having a T-shaped cross section, similarly to the lap fillet welded joint, it is possible to improve the fatigue life by suppressing deformation of the member by forming the stiffening bead.

Figure 11A:
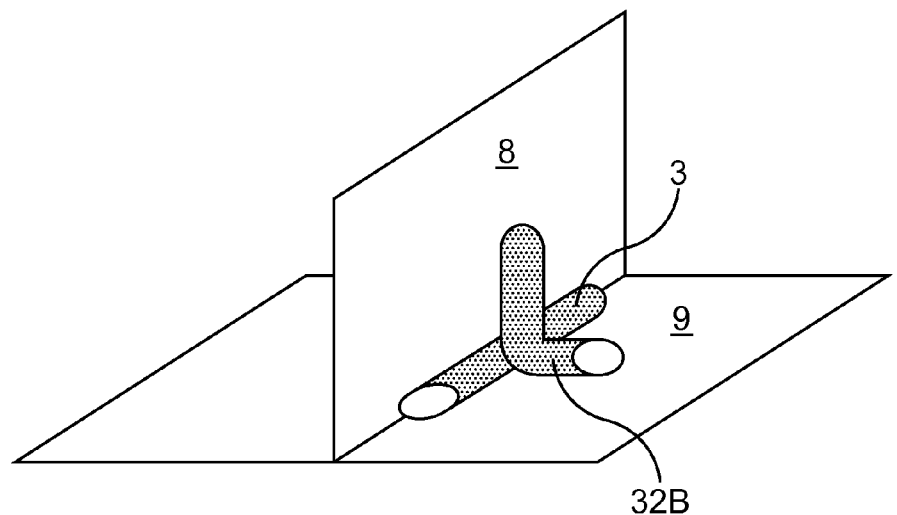
FIG. 11A is a view illustrating a first example of a disposition mode of the stiffening bead on the fillet welded joint having a T-shaped cross section.
Figure 11B:
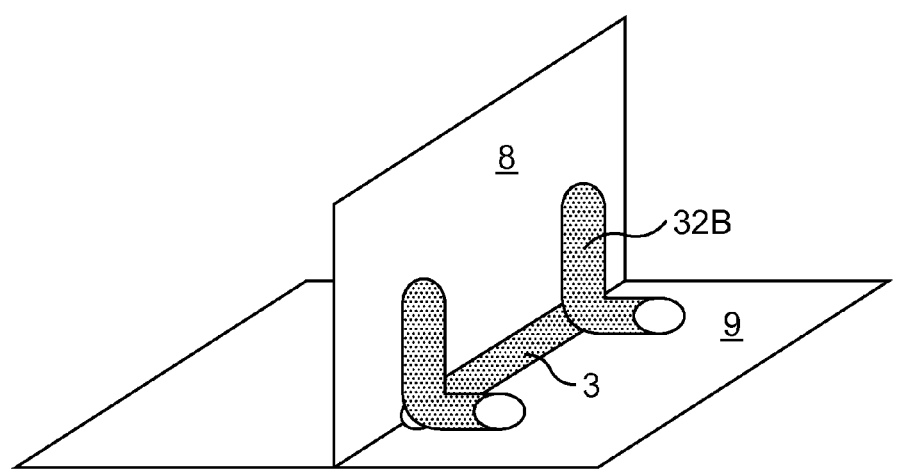
FIG. 11B is a view illustrating a second example of a disposition mode of the stiffening bead on the fillet welded joint having a T-shaped cross section.

FIG. 11 illustrate examples of dispositions of the stiffening bead 32 on the fillet welded joint having a T-shaped cross section formed of the vertical steel plate 8 and the horizontal steel plate 9. FIG. 11A is an example of a single cross bead 32B, and FIG. 11B is an example of a plurality of cross beads 32B.

In the fillet welded joint having a T-shaped cross section, although it depends on the height of the vertical steel plate 8, it is preferred to dispose the cross beads 32B extending across both the vertical steel plate 8 and the horizontal steel plate 9. However, the one-side bead 32A may be disposed on one of the vertical steel plate 8 and the horizontal steel plate 9. Also in the fillet welded joint having a T-shaped cross section, the stiffening beads 32 can be disposed under the same conditions as the lap fillet welded joint described in this embodiment.

(Angle of the Stiffening Bead 32)

The angle γ formed by the fillet bead 3 and the stiffening bead 32 is preferred to be substantially a right angle in terms of dynamics. Accordingly, in FIG. 4, the fillet bead 3 and the stiffening bead 32 are substantially at a right angle, but the angle γ formed by the fillet bead 3 and the stiffening bead 32 need not be substantially at a right angle. However, for the stiffening bead 32 to exhibit the function to increase stiffness of the steel plate and suppress bending, the angle γ needs to be 45° to 135°. This is because the aforementioned function of the stiffening bead 32 decreases significantly when the angle γ is less than 45° or more than 135°.

(Length of the Stiffening Bead 32)

As illustrated in FIG. 8, when the length of the stiffening bead 32 is short, the function to increase stiffness of the steel plate to improve fatigue strength of the welded joint cannot be exhibited sufficiently.

Here, when the stiffening bead 32 is the one-side bead 32A, the length of the stiffening bead 32 is a length between a contact point 32a of the fillet bead 3 and the stiffening bead 32 and a melting end 32b of the stiffening bead 32 (see FIG. 4). Further, when the stiffening bead 32 is the cross bead 32B, the length of the stiffening bead 32 is the length of melting ends on both sides of the stiffening bead 32.

According to results of an examination by the present inventors, it is necessary that the sum total l1 of lengths of stiffening beads 32 satisfies the following first condition (a1) so as to secure the function of the stiffening bead 32.

Sum total $l1$ of lengths of stiffening beads $32 \geq L \times 0.5$ \hfill (a1)

L: Length (mm) of fillet bead 3

When the sum total l1 of lengths of stiffening beads 32 is less than "L×0.5", it does not sufficiently exhibit the function as the stiffening bead 32. The upper limit value of the sum total l1 of lengths of stiffening beads 32 is constrained by the shape and structure of a steel product produced by welding, and hence is not limited in particular. The first condition (a1) is applied to both the one-side bead 32A and the cross bead 32B. That is, regardless of the ratio of lengths of stiffening beads 32 of the upper steel plate 1 and the lower steel plate 2, satisfying the condition (a1) can suppress deformation of both the upper steel plate 1 and the lower steel plate 2 and enables improvement in fatigue strength of the welded portion.

When a tensile load operates on the welded joint having a start edge and an end edge as illustrated in FIG. 2, stress concentration particularly in the start edge and the end edge of the welded portion increases. When a tensile load is inputted to the member, an even stress occurs in the plate width direction at a position separated from the welded portion. On the other hand, in the welded portion, the transmission range of the load is limited to a weld bead portion. Accordingly, stress concentration in the start edge and the end edge of the welded portion increases. Therefore, by disposing the stiffening bead 32 for another stiffening bead at positions close to the start edge and the end edge of the fillet bead 3 (welded portion), a crack suppressing effect on the start edge and the end edge of the fillet bead 3 increases. In particular, when the stiffening bead is disposed in the vicinity of start edge and the vicinity of end edge of the fillet bead 3, an effect to reduce the moment of bending generated by displacements of center axes of the upper steel plate 1 and the lower steel plate 2 as illustrated in FIG. 3 increases, and a crack occurring in the start edge or end edge of the fillet bead 3 can be suppressed.

The present inventors examined the relation between a distance from the start edge and end edge of the fillet bead 3 (welded portion) and the length of one stiffening bead 32. As a result, the inventors obtained knowledge that satisfying a second condition below allows obtaining the crack suppressing effect in the start edge and end edge of the fillet bead 3 without satisfying the first condition (a1). Hereinafter, the second condition of the length of the stiffening bead 32 will be described.

Figure 12:
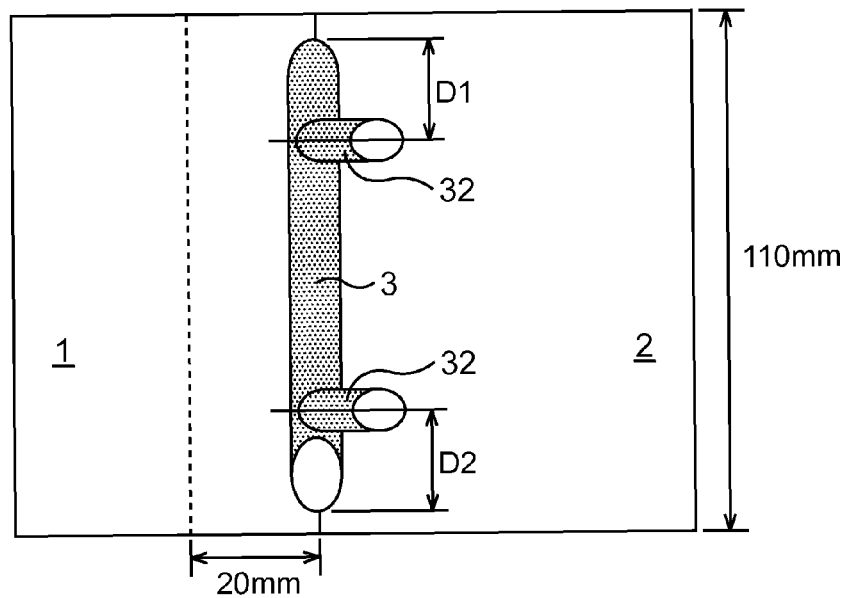
FIG. 12 is a view illustrating a test piece in which the stiffening beads are formed in the vicinities of start and end edges of the fillet bead.

FIG. 12 is a plan view illustrating a test piece in which the stiffening beads 32 are formed in the vicinities of start and end edges of the fillet bead 3. The steel plates 1, 2 constituting the test piece illustrated in FIG. 12 are of the steel type corresponding to a steel type "SP2" in Table 1 of an example, which will be described later. In FIG. 12, a fillet bead 3 having a length of 95 mm (L=95 mm) is disposed so that its center in the plate width direction becomes a center with respect to steel plates 1, 2 having a plate width of 110 mm, and thereafter the stiffening bead 32 is formed in each of the vicinity of start edge and the vicinity of end edge of the fillet bead 3 with the fillet bead 3 being a starting point.

Note that a width Wf of the fillet bead 3 is 7.5 mm, and the distance between (the center position of bead width of) the stiffening bead 32 and a position of an edge closer to this stiffening bead 32 out of positions of start edge and end edge of the fillet bead 3 is D. In FIG. 12, the distance from the position of start edge of the fillet bead 3 to the stiffening bead 32 is denoted by D1 and the distance from the position of end edge of the fillet bead 3 to the stiffening bead 32 is denoted by D2, but here these distances are both denoted by D.

The present inventors evaluated the fatigue strength of the case where the stiffening bead 32 is formed in the vicinities of start edge and end edge of the fillet bead 3 using this test piece. The rupture life under the condition that there is no stiffening bead 32 (test piece corresponding to the test piece symbol "TP34" in Table 4 to Table 6 in the example which will be described later) was 382000 times with respect to a test load of 18 kN. Accordingly, the case of a rupture life that is 1.5 times or more of the rupture life is judged as good (○), and other cases are judged as no good (X).

Figure 13:
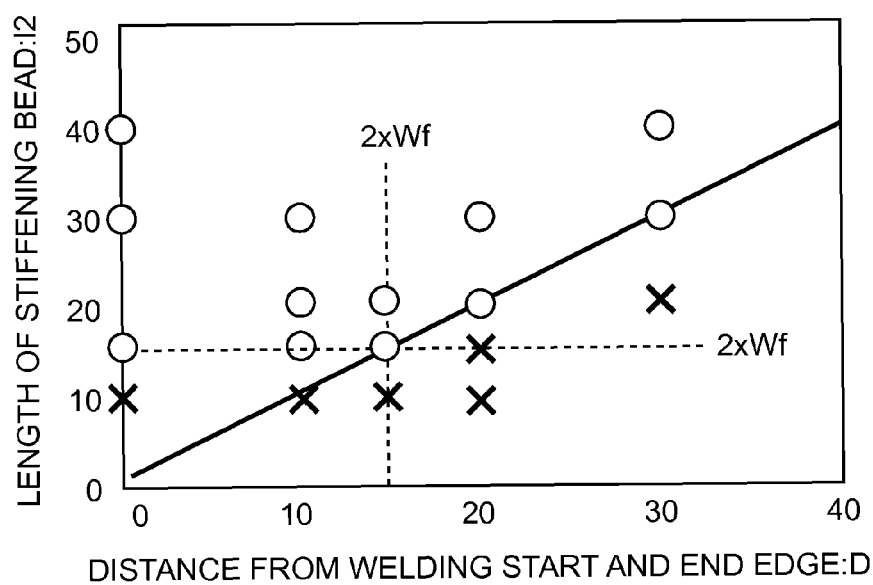
FIG. 13 is a diagram illustrating evaluation results of a test piece in which a length of the stiffening bead and a distance from a welding start and end edge are used as indexes.

FIG. 13 illustrates evaluation results of a test piece in which a length l2 of one stiffening bead 32 and the distance D between the stiffening bead 32 and the position of the edge closer to this stiffening bead 32 out of the positions of start edge and end edge of the fillet bead 3 (distance from welding start and end edges) on such a test piece are used as indexes.

In the case where the stiffening bead 32 is formed at positions (D=0 mm) of start and end edges of the fillet bead 3 and the case where the stiffening bead 32 is formed at the position (D=10 mm) where the distance D between the stiffening bead 32 and the position of the edge closer to this stiffening bead 32 out of the positions of start edge and end edge of the fillet bead 3 is 10 mm, an effect that the fatigue life improves was obtained when the length l2 of one stiffening bead 32 is 15 mm or more. Since the width Wf of the fillet bead 3 is 7.5 mm, when the stiffening beads 32 are formed at the positions closer to the start and end edges of the fillet bead 3, a length of double or more of the width Wf of the fillet bead 3 is needed as the length l2 of one stiffening bead 32.

On the other hand, when the distance D between the stiffening bead 32 and the position of the edge closer to this stiffening bead 32 out of the positions of start edge and end edge of the fillet bead 3 is double or more of the width Wf of the fillet bead, it is necessary to increase the length of each stiffening bead 32 according to the increase of this distance D, and the effect that the fatigue life improves was obtained under the condition that the length l2 of one stiffening bead 32 is equal to or more than the distance D (l2≥D).

From the above evaluation results, when the stiffening beads 32 are formed in the vicinities of start and end edges of the fillet bead 3, a favorable fatigue life can be obtained by setting the length l2 of one stiffening bead 32 to be equal to or more than the larger value out of 2×Wf and D. That is, regarding the length of the stiffening beads 32 disposed in the vicinities of start and end edges of the fillet bead 3, it may be provided that the following second condition (a2) is satisfied instead of the first condition (a1).

Length l2 of one stiffening bead 32≥max {2×Wf,D}    (a2)

Here, max{2×Wf, D} refers to the larger value out of 2×Wf and D.

The second condition (a2) does not include the influence of the plate thickness of the steel plate, but by increasing the height h and the width w of the stiffening bead 32 according to an increase of the plate thickness t as explained in the condition which will be described later, a suppression effect of the fatigue crack by the stiffening bead 32 was obtained.

Further, there is no special restriction in the range of the distance D between the stiffening bead 32 and the position of the edge closer to this stiffening bead 32 out of the positions of start edge and end edge of the fillet bead 3. However, the shorter the distance D, the shorter the stiffening bead 32 which can suppress the crack in the start edge and the end edge of the fillet bead 3. Accordingly, in view of efficiency in formation of the stiffening bead 32, the upper limit of this distance D is ¼ of the length L of the fillet bead As described above, when the stiffening bead 32 is formed within the range from the position of at least one of the start edge and the end edge of the fillet bead 3 to the position separated therefrom by ¼ of the length of the fillet bead 3 along the direction in which the fillet bead 3 is formed, the stiffening bead 32 may be formed within the range satisfying the following second condition (a2) instead of the first condition (a1). The second condition (a2) applies to both the one-side bead 32A and the cross bead 32B.

Note that there may be cases where the fatigue life of only one of the start edge portion and the end edge portion is a problem in an actual welded member depending on a state of the input load to the member. With respect to the welded member to which a load is inputted under this condition, the fatigue life improves by forming the stiffening bead in only one of the start edge (vicinity of the start edge) and the end edge (vicinity of the end edge).

Further, when the stiffening bead 32 is disposed in the vicinities of start edge and end edge of the fillet bead 3 (within the range from the position of at least one of the start edge and the end edge of the fillet bead 3 to the position separated therefrom by ¼ of the length L of the fillet bead 3 along the direction in which the fillet bead 3 is formed), the stiffening bead 32 may be formed within the aforementioned range so as to satisfy the first condition (a1) without satisfying the second condition (a2). That is, depending on the number and lengths of the stiffening beads 32 formed outside the range, the stiffening bead 32 formed within the range need not satisfy the second condition (a2).

Further, when the stiffening bead 32 is formed within the aforementioned range under the second condition (a2) and the stiffening bead 32 is formed outside the range, it is provided that the sum total l of all the stiffening beads 32 including the stiffening bead 32 formed within the range under the second condition (a2) satisfies the first condition (a1).

(Height of the Stiffening Bead 32)

It is provided that a height h of the stiffening bead 32 satisfies the following condition (b).

Height $h$ of the stiffening bead $32 \geq t/2$    (b)

t: Thickness (mm) of the steel member on which the stiffening bead 32 is formed When the height h of the stiffening bead 32 is less than "t/2" of a thickness t of the steel member on which the stiffening bead 32 is formed, it does not sufficiently exhibit the function as the stiffening bead 32. The larger the height h of the stiffening bead 32, the larger its effect, but naturally there is a limit to avoid strike through or melt down of the steel plate. Therefore, the height h of the stiffening bead 32 is, realistically, equal to or less than the "thickness t of the steel member on which the stiffening bead 32 is formed". The height h of the stiffening bead 32 refers to the distance in a height direction between the surface (an area where no bead is formed) of the steel member on which the stiffening bead 32 is formed and the highest position of the stiffening bead 32.

Note that when the stiffening bead 32 is the cross bead 32B and plate thicknesses of a plurality of steel plates to be welded are different, it is provided that the requirement of (b) is satisfied in each steel plate. The same applies to the conditions below.

(Width of the Stiffening Bead 32)

It is provided that the width w of the stiffening bead 32 satisfies the following condition (c).

$$\text{Width } w \text{ of the stiffening bead } 32 \geq 2.5t \quad \text{(c)}$$

t: Thickness (mm) of the steel member on which the stiffening bead 32 is formed

When the width w of the stiffening bead 32 is less than "2.5t" of the thickness t of the steel member on which the stiffening bead 32 is formed, it does not sufficiently exhibit the function as the stiffening bead 32. The upper limit of the width w of the stiffening bead 32 is not defined particularly, but similarly to the height h of the stiffening bead 32, it is necessary to form the stiffening bead 32 within the range that strike through or melt down of the steel plate does not occur. Thus, it is determined naturally in this view point.

(The Number of Stiffening Beads 32 Formed with Respect to the Fillet Bead 3)

It is preferred to dispose the stiffening bead 32 at least at one position in every "50t" of the length L of the fillet bead 3 where t is the thickness of the steel member on which the stiffening bead 32 is formed. That is, when the length L of the fillet bead 3 exceeds "50t", it is preferred to form the plurality of stiffening beads 32.

Therefore, it is desired that the number n of stiffening beads 32 formed on the fillet bead 3 having the length L satisfies the following condition (d).

$$L/n \leq 50t \quad \text{(d)}$$

n: Number of stiffening beads 32 formed on the fillet bead 3

L: Length (mm) of the fillet beads 3 t: Thickness (mm) of the steel member on which the stiffening bead 32 is formed (Thickness t of the Steel Member)

The thickness t (plate thickness) of the steel member is not particularly limited. However, in this embodiment, as described above, out-of-plane deformation of a thin steel plate member by forming the stiffening bead 32 is suppressed to thereby improve the fatigue life of the welded portion. Accordingly, an improving effect of the fatigue life can be obtained easily in a welded member of thin steel plate than in a welded member of thick steel plate, and it is desired that the plate thickness of the steel plate (thickness t of the steel member) is equal to or less than 3.6 mm.

Note that preferably the length L of the fillet bead 3 is 10t or more when two steel members are joined by fillet arc welding. This is because when the length L of the fillet bead 3 is less than 10t, the ratio of lengths of start and end edges of the fillet bead 3 to the joining length of the steel members increases, and sufficient joining strength cannot be secured.

(Other Conditions)

The arc welding conditions for forming the fillet bead 3 or forming the stiffening bead 32 or the composition of the welding wire used may be in accordance with ordinary methods, and are not limited to specific ones. However, it is preferred that, in terms of production, formation of the fillet bead 3 and formation of the stiffening bead 32 are performed sequentially using the same welding equipment. However, as long as the function to increase stiffness of the steel plate of the stiffening bead 32 is secured, the welding conditions of the both and the composition of the welding wire used may be different.

The welded joint targeted in this embodiment may be a fillet welded joint formed by fillet arc welding and is not limited to any particular welded joint. However, preferred ones include a welded joint formed by overlapping a steel member and a steel member and fillet arc welding the steel members, and a welded joint formed by placing an end portion of a steel member on a surface of a steel member and fillet arc welding the end portion and the surface. Further, the welded joint targeted at this embodiment is not limited to welding of steel plates with each other. For example, the method of this embodiment can be applied to joints of steel plate members, steel pipes, and section steels which are press formed, as long as they have a plate thickness of approximately 3.6 mm or less.

Further, in the welded joint, in order to form the stiffening bead overlapping on the fillet bead, it is necessary that there is an area where the stiffening bead can be formed with a required angle and a required length, height, and width in the vicinity of the welded joint. However, when the stiffening bead is formed across two steel members to be welded, the start edge and the end edge of the fillet bead and the stiffening bead may be separated.

Note that when the upper steel plate and the lower steel plate are overlapped, it is preferred that there is no gap between the both, but there may occur a gap of substantially 1 mm between the both in the course of carrying out the welding. In this embodiment, when there is a gap of about 1 mm between the upper steel plate and the lower steel plate, the function of the stiffening bead is not hindered, and occurrence of the fatigue crack is suppressed significantly.

Further, the method of this embodiment can be applied also to metal members other than the steel member. For example, it is possible to apply the method of this embodiment to aluminum members or stainless members instead of the steel member. Further, the method of this embodiment can be applied also to metal members of different types.

EXAMPLES

Next, examples of the present invention will be described. However, the conditions in the examples are of one conditional example employed for confirming applicability and effects of the present invention, and the present invention is not limited to this one conditional example. The present invention can employ various conditions as long as the object of the present invention can be achieved without departing from the gist of the present invention.

Example 1

A fatigue test was performed using a test piece in which lap fillet arc welding was performed on thin steel plates, and effects of welded joints were verified. Component compositions of sample steel plates are illustrated in Table 1.

[Table 1]

TABLE 1

| STEEL TYPE | PLATE THICKNESS (mm) | STATIONARY STRENGTH | | | CHEMICAL COMPOSITION (MASS %) | | | | | | | | |
|---|---|---|---|---|---|---|---|---|---|---|---|---|---|
| | | YP (MPa) | TS (MPa) | EL (%) | C | Si | Mn | P | S | Al | N | O | Ti |
| SP1 | 3.4 | 320 | 475 | 39 | 0.15 | 0.3 | 0.8 | 0.02 | 0.004 | 0.04 | 0.003 | 0.002 | — |
| SP2 | 2.6 | 560 | 800 | 21 | 0.11 | 1.2 | 2.1 | 0.01 | 0.004 | 0.05 | 0.004 | 0.003 | 0.05 |
| SP3 | 1.2 | 550 | 650 | 25 | 0.12 | 0.4 | 1.5 | 0.02 | 0.004 | 0.03 | 0.003 | 0.002 | — |

The test piece having the fillet bead illustrated in FIG. 2 was prepared and subjected to a fatigue test. With respect to the test piece illustrated in FIG. 2, a test piece in which the stiffening bead is disposed as illustrated in FIG. 4 was further prepared and subjected to a fatigue test.

Specifically, as illustrated in FIG. 2, two steel plates having a plate width of 60 mm were overlapped with an overlapping portion of 20 mm, and lap fillet arc welding was designed so that a moving distance of a welding torch is 40 mm, so as to prepare the test piece.

Note that a melting portion widens at a moving edge of the welding torch, and thus the actual length of a fillet bead is slightly larger than a taught distance.

Further, as illustrated in FIG. 4, one stiffening bead was disposed substantially perpendicular to the fillet bead in the center portion in a width direction of the test piece of FIG. 2, and a test was performed. The welding start point of the stiffening bead is a surface of the fillet bead, and the stiffening bead having a required length was formed on the lower steel plate. Note that the length of the stiffening bead is a length to the melting end of the stiffening bead with the contact point between the fillet bead and the stiffening bead being a starting point.

The welding conditions are as follows.

<Common Welding Conditions>
Welding method: consumable electrode welding
Welding power supply: DP350 (made by DAIHEN Corporation)
Welding mode: DC-Pulse
Welding posture: downward, horizontal
Distance between chip steel plates (projecting length): 15 mm
Shielding gas type: Ar+20% $CO_2$
Shielding gas flow rate: 20 L/min
Welding wire: JIS 23312 YGW15 equivalent
<Formation Condition of the Fillet Bead>
Torch angle: standing angle 55° from the lower plate, angle of advance 0°
Target position: corner of the lap portion
Welding rate: 40 cm/min Wire feeding rate: a value which does not cause an undercut is set to the upper steel plate (one example: 3.8/min (approximately 120 A, approximately 22V) in the case of a lap fillet arc welding of the upper steel plate having a plate thickness of 2.6 mm))
<Conditions of Forming the Stiffening Bead>
Torch angle: standing angle 90° from the steel plate, angle of advance 0°
Target position and welding direction: welding on the lower steel plate in a direction perpendicular to the fillet bead in the center in the width direction of the test piece with a welded metal surface of the fillet bead being a starting point
Welding rate: 50 cm/min
Wire feeding rate: same as the formation conditions of the fillet bead The test piece is held in an electrohydraulic fatigue test apparatus so that the toe portion of the lower steel plate of the prepared test piece becomes the center. Then, it is subjected to an axial tensile fatigue test with a load range being constant (constant stress range), a load ratio being 0.1, and a repetition frequency being 25 Hz. Note that for matching the axial center of the test apparatus, the test piece was held while placing an attached plate having the same plate thickness on the upper steel plate and the lower steel plate.

Note that the load range in which the test piece on which no stiffening bead is formed breaks by 400,000 times was searched for in each steel plate in a prior test, and the number of breakages of the test piece on which no stiffening bead is formed is employed as a comparison reference of fatigue life in each steel plate.

The welding conditions and fatigue characteristic evaluation results are illustrated in Table 2 and Table 3.

In the invention examples TP4 to 15, a fatigue life improving percentage of 150% or more was obtained in comparative examples TP1 to 3 in which no stiffening bead is formed, but in comparative examples TP16 to 27, the stiffening bead did not satisfy the necessary condition and the fatigue life improving percentage was inferior to that of the invention examples.

TABLE 2

| TEST PIECE SYMBOL | CATEGORY | STEEL PLATE | PLATE THICKNESS (mm) | LENGTH OF FILLET BEAD (mm) | LENGTH OF STIFFENING BEAD (mm) | LENGTH OF STIFFENING BEAD WITH RESPECT TO FILLET BEAD (%) | JUDGING LENGTH OF STIFFENING BEAD | HEIGHT OF STIFFENING BEAD (mm) | HEIGHT OF STIFFENING BEAD WITH RESPECT TO PLATE THICKNESS (%) | JUDGING HEIGHT OF STIFFENING BEAD |
|---|---|---|---|---|---|---|---|---|---|---|
| TP1 | COMPARATIVE EXAMPLE | SP1 | 3.4 | 45.5 | — | — | — | — | — | — |

TABLE 2-continued

| TEST PIECE SYMBOL | CATEGORY | STEEL PLATE | PLATE THICK-NESS (mm) | LENGTH OF FILLET BEAD (mm) | LENGTH OF STIFF-ENING BEAD (mm) | LENGTH OF STIFFENING BEAD WITH RESPECT TO FILLET BEAD (%) | JUDGING LENGTH OF STIFF-ENING BEAD | HEIGHT OF STIFF-ENING BEAD (mm) | HEIGHT OF STIFFENING BEAD WITH RESPECT TO PLATE THICKNESS (%) | JUDGING HEIGHT OF STIFF-ENING BEAD |
|---|---|---|---|---|---|---|---|---|---|---|
| TP2 | COMPARATIVE EXAMPLE | SP2 | 2.6 | 44.0 | — | — | — | — | — | — |
| TP3 | COMPARATIVE EXAMPLE | SP3 | 1.2 | 42.5 | — | — | — | — | — | — |
| TP4 | INVENTION EXAMPLE | SP1 | 3.4 | 45.5 | 23 | 51 | ○ | 2.2 | 65 | ○ |
| TP5 | INVENTION EXAMPLE | SP1 | 3.4 | 45.5 | 34 | 75 | ○ | 2.1 | 62 | ○ |
| TP6 | INVENTION EXAMPLE | SP1 | 3.4 | 45.5 | 44 | 97 | ○ | 2.2 | 65 | ○ |
| TP7 | INVENTION EXAMPLE | SP1 | 3.4 | 45.5 | 54 | 119 | ○ | 2.3 | 68 | ○ |
| TP8 | INVENTION EXAMPLE | SP2 | 2.6 | 44.0 | 22 | 50 | ○ | 1.7 | 65 | ○ |
| TP9 | INVENTION EXAMPLE | SP2 | 2.6 | 44.0 | 33 | 75 | ○ | 1.6 | 62 | ○ |
| TP10 | INVENTION EXAMPLE | SP2 | 2.6 | 44.0 | 43 | 98 | ○ | 1.7 | 65 | ○ |
| TP11 | INVENTION EXAMPLE | SP2 | 2.6 | 44.0 | 53 | 120 | ○ | 1.8 | 69 | ○ |
| TP12 | INVENTION EXAMPLE | SP3 | 1.2 | 42.5 | 22 | 52 | ○ | 0.9 | 75 | ○ |
| TP13 | INVENTION EXAMPLE | SP3 | 1.2 | 42.5 | 32 | 75 | ○ | 0.8 | 67 | ○ |
| TP14 | INVENTION EXAMPLE | SP3 | 1.2 | 42.5 | 42 | 99 | ○ | 0.8 | 67 | ○ |
| TP15 | INVENTION EXAMPLE | SP3 | 1.2 | 42.5 | 52 | 122 | ○ | 0.9 | 75 | ○ |
| TP16 | COMPARATIVE EXAMPLE | SP1 | 3.4 | 45.5 | 54 | 119 | ○ | 1.8 | 53 | ○ |
| TP17 | COMPARATIVE EXAMPLE | SP2 | 2.6 | 44.0 | 32 | 73 | ○ | 1.4 | 54 | ○ |
| TP18 | COMPARATIVE EXAMPLE | SP3 | 1.2 | 42.5 | 23 | 54 | ○ | 0.8 | 67 | ○ |
| TP19 | COMPARATIVE EXAMPLE | SP1 | 3.4 | 45.5 | 24 | 53 | ○ | 1.5 | 44 | x |
| TP20 | COMPARATIVE EXAMPLE | SP2 | 2.6 | 44.0 | 53 | 120 | ○ | 1.2 | 46 | x |
| TP21 | COMPARATIVE EXAMPLE | SP3 | 1.2 | 42.5 | 31 | 73 | ○ | 0.5 | 42 | x |
| TP22 | COMPARATIVE EXAMPLE | SP1 | 3.4 | 45.5 | 35 | 77 | ○ | 1.2 | 35 | x |
| TP23 | COMPARATIVE EXAMPLE | SP2 | 2.6 | 44.0 | 23 | 52 | ○ | 1.0 | 38 | x |
| TP24 | COMPARATIVE EXAMPLE | SP3 | 1.2 | 42.5 | 51 | 120 | ○ | 0.5 | 42 | x |
| TP25 | COMPARATIVE EXAMPLE | SP1 | 3.4 | 45.5 | 22 | 48 | x | 2.2 | 65 | ○ |
| TP26 | COMPARATIVE EXAMPLE | SP2 | 2.6 | 44.0 | 21 | 48 | x | 1.8 | 69 | ○ |
| TP27 | COMPARATIVE EXAMPLE | SP3 | 1.2 | 42.5 | 20 | 47 | x | 1.0 | 83 | ○ |

TABLE 3

| TEST PIECE SYMBOL | CATEGORY | WIDTH OF STIFFENING BEAD (mm) | WIDTH OF STIFFENING BEAD WITH RESPECT TO PLATE THICKNESS (%) | JUDGING WIDTH OF STIFFENING BEAD | FATIGUE TEST LOAD RANGE (kN) | FATIGUE LIFE (TIMES) | FATIGUE LIFE IMPROVING PERCENTAGE (%) | TEST PIECE SYMBOL AS REFERENCE OF CALCULATING IMPROVING PERCENTAGE |
|---|---|---|---|---|---|---|---|---|
| TP1 | COMPARATIVE EXAMPLE | — | — | — | 8.5 | 398000 | — | — |
| TP2 | COMPARATIVE EXAMPLE | — | — | — | 10 | 392000 | — | — |
| TP3 | COMPARATIVE EXAMPLE | — | — | — | 4.5 | 408000 | — | — |

TABLE 3-continued

| TEST PIECE SYMBOL | CATEGORY | WIDTH OF STIFFENING BEAD (mm) | WIDTH OF STIFFENING BEAD WITH RESPECT TO PLATE THICKNESS (%) | JUDGING WIDTH OF STIFFENING BEAD | FATIGUE TEST LOAD RANGE (kN) | FATIGUE LIFE (TIMES) | FATIGUE LIFE IMPROVING PERCENTAGE (%) | TEST PIECE SYMBOL AS REFERENCE OF CALCULATING IMPROVING PERCENTAGE |
|---|---|---|---|---|---|---|---|---|
| TP4 | INVENTION EXAMPLE | 9.4 | 276 | ○ | 8.5 | 620000 | 156 | TP1 |
| TP5 | INVENTION EXAMPLE | 9.6 | 282 | ○ | 8.5 | 899000 | 226 | TP1 |
| TP6 | INVENTION EXAMPLE | 9.8 | 288 | ○ | 8.5 | 1140000 | 286 | TP1 |
| TP7 | INVENTION EXAMPLE | 9.5 | 279 | ○ | 8.5 | 1820000 | 457 | TP1 |
| TP8 | INVENTION EXAMPLE | 6.8 | 262 | ○ | 10.0 | 591000 | 151 | TP2 |
| TP9 | INVENTION EXAMPLE | 6.7 | 258 | ○ | 10.0 | 888000 | 227 | TP2 |
| TP10 | INVENTION EXAMPLE | 6.8 | 262 | ○ | 10.0 | 1130000 | 288 | TP2 |
| TP11 | INVENTION EXAMPLE | 6.9 | 265 | ○ | 10.0 | 1760000 | 449 | TP2 |
| TP12 | INVENTION EXAMPLE | 3.2 | 267 | ○ | 4.5 | 612000 | 150 | TP3 |
| TP13 | INVENTION EXAMPLE | 3.3 | 275 | ○ | 4.5 | 878000 | 215 | TP3 |
| TP14 | INVENTION EXAMPLE | 3.1 | 258 | ○ | 4.5 | 1160000 | 284 | TP3 |
| TP15 | INVENTION EXAMPLE | 3.2 | 267 | ○ | 4.5 | 1790000 | 439 | TP3 |
| TP16 | COMPARATIVE EXAMPLE | 7.5 | 221 | x | 8.5 | 571000 | 143 | TP1 |
| TP17 | COMPARATIVE EXAMPLE | 5.2 | 200 | x | 10.0 | 479000 | 122 | TP2 |
| TP18 | COMPARATIVE EXAMPLE | 2.5 | 208 | x | 4.5 | 428000 | 105 | TP3 |
| TP19 | COMPARATIVE EXAMPLE | 8.9 | 262 | ○ | 8.5 | 425000 | 107 | TP1 |
| TP20 | COMPARATIVE EXAMPLE | 6.8 | 262 | ○ | 10.0 | 581000 | 148 | TP2 |
| TP21 | COMPARATIVE EXAMPLE | 3.2 | 267 | ○ | 4.5 | 518000 | 127 | TP3 |
| TP22 | COMPARATIVE EXAMPLE | 7.0 | 206 | x | 8.5 | 444000 | 112 | TP1 |
| TP23 | COMPARATIVE EXAMPLE | 4.8 | 185 | x | 10.0 | 406000 | 104 | TP2 |
| TP24 | COMPARATIVE EXAMPLE | 2.2 | 183 | x | 4.5 | 523000 | 128 | TP3 |
| TP25 | COMPARATIVE EXAMPLE | 9.6 | 279 | ○ | 8.5 | 581000 | 146 | TP1 |
| TP26 | COMPARATIVE EXAMPLE | 7.3 | 281 | ○ | 10.0 | 548000 | 140 | TP2 |
| TP27 | COMPARATIVE EXAMPLE | 3.1 | 258 | ○ | 4.5 | 553000 | 136 | TP3 |

Example 2

Test pieces were further prepared by forming the stiffening bead on the test piece illustrated in FIG. 2 in the modes illustrated in FIG. 9A to FIG. 9E, and were subjected to the fatigue test.

TP28 to 33, 39 are examples in which a single stiffening bead is disposed, one-side beads in TP28 to 30, 39 correspond to the mode of FIG. 9A (angle γ is at 90 degrees in TP39), and cross beads in TP31 to 33 correspond to the mode of FIG. 9B. Further, TP36 to 38 are examples in which a plurality of stiffening beads are disposed, and TP36 corresponds to the mode of FIG. 9C, TP37 to the mode of FIG. 9D, and TP38 to the mode of FIG. 9E. TP34, 35 correspond to the mode of FIG. 2, in which the fillet bead is disposed without disposing the stiffening bead.

Upon preparing each test piece, the target position of the stiffening bead and the welding direction were as in FIG. 9A and FIG. 9E, and besides that, it was prepared under the same condition as example 1. In TP36 to 38, welding conditions are described for each stiffening bead.

Welding conditions and fatigue characteristic evaluation results are illustrated in Table 4 to Table 6.

In the invention examples, a fatigue life improving percentage over 200% was obtained with respect to the test piece on which no stiffening bead is formed. In the field of judging the stiffening bead length in Table 3, "○" is added when the above-described first condition (a1) is satisfied.

In TP28 to 33 and TP36 to 38, L (length of fillet bead)/n (number of stiffening beads) is small as compared to 50t (t: steel thickness), but in TP39, L/n is large as compared to 50t. Accordingly, the fatigue life improving percentage of TP39 was approximately 161%.

TABLE 4

| TEST PIECE SYMBOL | CATEGORY | TYPE OF STIFFENING BEAD | STEEL PLATE | PLATE THICK-NESS t (mm) | LENGTH L OF FILLET BEAD (mm) | ANGLE γ OF STIFF-ENING BEAD WITH RESPECT TO FILLET BEAD | JUDGING ANGLE OF STIFF-ENING BEAD | LENGTH OF STIFF-ENING BEAD OF LOWER PLATE (mm) | LENGTH OF STIFF-ENING BEAD OF UPPER PLATE (mm) | SUM OF LENGTHS OF STIFF-ENING BEADS (mm) |
|---|---|---|---|---|---|---|---|---|---|---|
| TP28 | INVENTION | ONE-SIDE BEAD | SP2 | 2.6 | 45.5 | 60 | ○ | 43 | — | 43 |
| TP29 | INVENTION | ONE-SIDE BEAD | SP1 | 3.4 | 44.2 | 130 | ○ | 54 | — | 54 |
| TP30 | COMPARISON | ONE-SIDE BEAD | SP2 | 2.6 | 45.2 | 25 | x | 32 | — | 32 |
| TP31 | INVENTION | CROSS BEAD | SP2 | 2.6 | 45.5 | 90 | ○ | 21 | 15 | 36 |
| TP32 | INVENTION | CROSS BEAD | SP2 | 2.6 | 45.2 | 90 | ○ | 32 | 25 | 57 |
| TP33 | INVENTION | CROSS BEAD | SP3 | 1.2 | 45.1 | 90 | ○ | 32 | 33 | 65 |
| TP34 | COMPARISON | NO STIFFENING BEAD | SP2 | 2.6 | 95.4 | — | — | — | — | — |
| TP35 | COMPARISON | NO STIFFENING BEAD | SP3 | 1.2 | 95.2 | — | — | — | — | — |
| TP36 | INVENTION | CROSS BEAD(1) | SP2 | 2.6 | 95.2 | 90 | ○ | 25 | 25 | 50 |
|  |  | CROSS BEAD(2) |  | 2.6 | 95.2 | 90 | ○ | 30 | 25 | 55 |
| TP37 | INVENTION | ONE-SIDE BEAD(1) | SP2 | 2.6 | 95.4 | 90 | ○ | 35 | — | 35 |
|  |  | ONE-SIDE BEAD(2) |  | 2.6 | 95.4 | 90 | ○ | 32 | — | 32 |
| TP38 | INVENTION | CROSS BEAD(1) | SP3 | 1.2 | 95.1 | 90 | ○ | 26 | 25 | 51 |
|  |  | ONE-SIDE BEAD(2) |  | 1.2 | 95.1 | 90 | ○ | 25 | — | 25 |
|  |  | ONE-SIDE BEAD(3) |  | 1.2 | 95.1 | 90 | ○ | 25 | — | 25 |
|  |  | CROSS BEAD(4) |  | 1.2 | 95.1 | 90 | ○ | 26 | 24 | 50 |
| TP39 | INVENTION | ONE-SIDE BEAD | SP3 | 1.2 | 95.2 | 90 | ○ | 65 | — | 65 |

TABLE 5

| TEST PIECE SYMBOL | CATEGORY | LENGTH OF STIFFENING BEAD WITH RESPECT TO FILLET BEAD (%) | SUM OF LENGTHS OF STIFFENING BEADS WITH RESPECT TO FILLET BEAD (%) | JUDGING LENGTH OF STIFFENING BEAD | HEIGHT OF STIFFENING BEAD (mm) | RATIO OF HEIGHT OF STIFFENING BEAD TO PLATE THICKNESS | JUDGING HEIGHT OF STIFFENING BEAD |
|---|---|---|---|---|---|---|---|
| TP28 | INVENTION | 95 | 95 | ○ | 1.9 | 73 | ○ |
| TP29 | INVENTION | 122 | 122 | ○ | 2.2 | 65 | ○ |
| TP30 | COMPARISON | 71 | 71 | ○ | 1.8 | 69 | ○ |
| TP31 | INVENTION | 79 | 79 | ○ | 1.7 | 65 | ○ |
| TP32 | INVENTION | 126 | 126 | ○ | 1.9 | 73 | ○ |
| TP33 | INVENTION | 144 | 144 | ○ | 1.1 | 92 | ○ |
| TP34 | COMPARISON | — | — | — | — | — | — |
| TP35 | COMPARISON | — | — | — | — | — | — |
| TP36 | INVENTION | 53 | 110 | ○ | 1.7 | 65 | ○ |
|  |  | 58 |  |  | 1.9 | 73 | ○ |
| TP37 | INVENTION | 37 | 70 | ○ | 1.8 | 69 | ○ |
|  |  | 34 |  |  | 1.9 | 73 | ○ |
| TP38 | INVENTION | 54 | 159 | ○ | 1.8 | 150 | ○ |
|  |  | 26 |  |  | 1.6 | 133 | ○ |
|  |  | 26 |  |  | 1.7 | 142 | ○ |
|  |  | 53 |  |  | 1.5 | 125 | ○ |
| TP39 | INVENTION | 68 | 68 | ○ | 1.7 | 142 | ○ |

TABLE 6

| TEST PIECE SYMBOL | CATEGORY | WIDTH OF STIFF- ENING BEAD (mm) | RATIO OF WIDTH OF STIFF- ENING BEAD TO PLATE THICK- NESS | JUDGING WIDTH OF STIFF- ENING BEAD | L/n | 50t | FATIGUE TEST LOAD (kN) | FATIGUE LIFE (TIMES) | FATIGUE LIFE IMPROVING PERCENTAGE (%) | TEST PIECE SYMBOL AS REFERENCE OF CALCULATING FATIGUE LIFE IMPROVING PERCENTAGE |
|---|---|---|---|---|---|---|---|---|---|---|
| TP28 | INVENTION | 7.1 | 273 | ○ | 45.5 | 130 | 10 | 991000 | 253 | TP2 |
| TP29 | INVENTION | 9.4 | 276 | ○ | 44.2 | 170 | 8.5 | 1520360 | 382 | TP1 |
| TP30 | COMPARISON | 7.3 | 281 | ○ | 45.2 | 130 | 10 | 478240 | 122 | TP2 |
| TP31 | INVENTION | 6.8 | 262 | ○ | 45.5 | 130 | 10 | 866320 | 221 | TP2 |
| TP32 | INVENTION | 7.2 | 277 | ○ | 45.2 | 130 | 10 | 1952160 | 498 | TP2 |
| TP33 | INVENTION | 3.8 | 317 | ○ | 45.1 | 60 | 4.5 | 1864560 | 457 | TP3 |
| TP34 | COMPARISON | — | — | — | — | — | 18 | 382000 | — | — |
| TP35 | COMPARISON | — | — | — | — | — | 8.5 | 379000 | — | — |
| TP36 | INVENTION | 6.9 | 265 | ○ | 47.6 | 130 | 18 | 1619680 | 424 | TP34 |
|  |  | 7.2 | 277 | ○ |  |  |  |  |  |  |
| TP37 | INVENTION | 7.1 | 273 | ○ | 47.7 | 130 | 18 | 844220 | 221 | TP34 |
|  |  | 7.2 | 277 | ○ |  |  |  |  |  |  |
| TP38 | INVENTION | 3.7 | 308 | ○ | 23.775 | 60 | 8.5 | 1826780 | 482 | TP35 |
|  |  | 3.5 | 292 | ○ |  |  |  |  |  |  |
|  |  | 3.5 | 292 | ○ |  |  |  |  |  |  |
|  |  | 3.8 | 317 | ○ |  |  |  |  |  |  |
| TP39 | INVENTION | 3.5 | 292 | ○ | 95.2 | 60 | 8.5 | 610190 | 161 | TP34 |

Example 3

In a fillet welded joint having a T-shaped cross section formed by a vertical steel plate and a horizontal steel plate, the test piece in which the fillet bead is formed only on one side of the corner and a test piece on which the stiffening bead is further formed across the fillet bead on this test piece were prepared and subjected to the fatigue test.

TP41 is an example in which a single stiffening bead is disposed and corresponds to the mode of FIG. 10A, and TP42 is an example on which the stiffening bead is disposed on both end portions of the fillet bead and corresponds to the mode of FIG. 10B.

Upon preparing each test piece, the shape of the joint, the target position of the stiffening bead, and the mode of forming the stiffening bead were as in FIG. 10, and besides that, it was prepared under the same condition as example 1. In TP42, welding conditions are described for each stiffening bead.

Welding conditions and fatigue characteristic evaluation results are illustrated in Table 7 and Table 8.

In the invention examples of TP41, 42, a fatigue life improving percentage over 500% was obtained with respect to the comparative example TP40 on which no stiffening bead is formed.

TABLE 7

| TEST PIECE SYMBOL | CATEGORY | TYPE OF STIFFENING BEAD | STEEL PLATE | PLATE THICKNESS (mm) | LENGTH OF FILLET BEAD (mm) | ANGLE γ OF STIFFENING BEAD WITH RESPECT TO FILLET BEAD | JUDGING ANGLE OF STIFFENING BEAD |
|---|---|---|---|---|---|---|---|
| TP40 | COMPARISON | NO STIFFENING BEAD | SP2 | 2.6 | 45.2 | — | — |
| TP41 | INVENTION | CROSS BEAD | SP2 | 2.6 | 45.1 | 90 | ○ |
| TP42 | INVENTION | CROSS BEAD(1) | SP2 | 2.6 | 45.3 | 90 | ○ |
|  |  | CROSS BEAD(2) |  | 2.6 | 45.2 | 90 | ○ |

| TEST PIECE SYMBOL | CATEGORY | LENGTH OF STIFFENING BEAD OF LOWER PLATE (mm) | LENGTH OF STIFFENING BEAD OF VERTICAL PLATE (mm) | SUM OF LENGTHS OF STIFFENING BEADS (mm) | LENGTH OF STIFFENING BEADS WITH RESPECT TO FILLET BEAD (%) | SUM OF LENGTHS OF STIFFENING BEADS WITH RESPECT TO FILLET BEAD (%) | JUDGING LENGTH OF STIFFENING BEAD |
|---|---|---|---|---|---|---|---|
| TP40 | COMPARISON | — | — | — | — | — | — |
| TP41 | INVENTION | 32 | 35 | 67 | 149 | 149 | ○ |
| TP42 | INVENTION | 27 | 32 | 59 | 130 | 267 | ○ |
|  |  | 27 | 35 | 62 | 137 |  |  |

TABLE 8

(Example 4)

| TEST PIECE SYMBOL | CATEGORY | HEIGHT OF STIFFENING BEAD (mm) | RATIO OF BEAD HEIGHT TO PLATE THICKNESS | JUDGING HEIGHT OF STIFFENING BEAD | WIDTH OF STIFFENING BEAD (mm) | RATIO OF WIDTH OF STIFFENING BEAD TO PLATE THICKNESS |
|---|---|---|---|---|---|---|
| TP40 | COMPARISON | — | — | — | — | — |
| TP41 | INVENTION | 1.1 | 42 | ○ | 3.8 | 146 |
| TP42 | INVENTION | 1.7 | 65 | ○ | 6.9 | 265 |
|  |  | 1.9 | 73 | ○ | 7.2 | 277 |

| TEST PIECE SYMBOL | CATEGORY | JUDGING WIDTH OF STIFFENING BEAD | FATIGUE TEST LOAD (kN) | FATIGUE LIFE (TIMES) | FATIGUE LIFE IMPROVING PERCENTAGE (%) | TEST PIECE SYMBOL AS REFERENCE OF CALCULATING FATIGUE LIFE IMPROVING PERCENTAGE |
|---|---|---|---|---|---|---|
| TP40 | COMPARISON | — | 1 | 354000 | — | — |
| TP41 | INVENTION | ○ | 4.5 | 1819560 | 514 | TP40 |
| TP42 | INVENTION | ○ | 18 | 2237280 | 632 | TP40 |
|  |  | ○ |  |  |  |  |

Test pieces were further prepared by forming the stiffening bead on the test piece illustrated in FIG. 2 in the modes illustrated in FIG. 9F to FIG. 9I, and were subjected to the fatigue test.

TP43 to 47 are examples in which a plurality of stiffening beads are disposed, TP43 corresponds to the mode of FIG. 9F, TP44 to the mode of FIG. 9G, TP45, 47 to the mode of FIG. 9H, and TP46 to the mode of FIG. 9I. TP34 is the same as that illustrated in Table 4 to Table 6.

Upon preparing each test piece, the target position of the stiffening bead and the welding direction were as in FIG. 9F to FIG. 9I, and besides that, it was prepared under the same condition as example 3. In TP43 to 47, welding conditions are described for each stiffening bead.

Welding conditions and fatigue characteristic evaluation results are illustrated in Table 9 and Table 10. In the field of judging the stiffening bead length (first condition) in Table 10, "○" is added when the above-described first condition (a1) is satisfied. Further, in the field of judging the stiffening bead length (second condition) in Table 9, "○" is added when the above-described second condition (a2) is satisfied.

In TP43 to TP47, in the vicinity of start edge and the vicinity of end edge of the fillet bead, a stiffening bead having a length less than ½ of the length L of the fillet bead is formed. In TP43 to 46, the stiffening bead is formed so as to satisfy the above-described second condition (a2) within the range from a position of the start edge and the end edge of the fillet bead to a position separated therefrom by ¼ of a length L of the fillet bead along the direction in which the fillet bead is formed. In the invention examples of TP43 to 46, a fatigue life improving percentage of 150% or more was obtained with respect to the comparative example TP34 on which no stiffening bead is formed. On the other hand, in the comparative example of TP47, the stiffening bead does not satisfy the above-described second condition (a2), and the fatigue life improving percentage was inferior to that of the invention examples.

TABLE 9

| TEST PIECE SYMBOL | CATEGORY | TYPE OF STIFFENING BEAD | STEEL PLATE | PLATE THICKNESS (mm) | LENGTH OF FILLET BEAD (mm) | ANGLE γ OF STIFFENING BEAD WITH RESPECT TO FILLET BEAD | JUDGING ANGLE OF STIFFENING BEAD |
|---|---|---|---|---|---|---|---|
| TP34 | COMPARISON | NO STIFFENING BEAD | SP2 | 2.6 | 95.4 | — | — |
| TP43 | INVENTION | ONE-SIDE BEAD(1) | SP2 | 2.6 | 95.4 | 90 | ○ |
|  |  | ONE-SIDE BEAD(2) |  | 2.6 | 95.4 | 90 | ○ |
| TP44 | INVENTION | CROSS BEAD(1) | SP2 | 2.6 | 95.2 | 90 | ○ |
|  |  | CROSS BEAD(2) |  | 2.6 | 95.2 | 90 | ○ |
| TP45 | INVENTION | ONE-SIDE BEAD(1) | SP2 | 2.6 | 95.4 | 90 | ○ |
|  |  | ONE-SIDE BEAD(2) |  | 2.6 | 95.4 | 90 | ○ |
| TP46 | INVENTION | CROSS BEAD(1) | SP2 | 2.6 | 95.1 | 90 | ○ |
|  |  | ONE-SIDE BEAD(2) |  | 2.6 | 95.1 | 90 | ○ |
|  |  | ONE-SIDE BEAD(3) |  | 2.6 | 95.1 | 90 | ○ |
|  |  | CROSS BEAD(4) |  | 2.6 | 95.1 | 90 | ○ |
| TP47 | COMPARISON | ONE-SIDE BEAD(1) | SP2 | 2.6 | 95.4 | 90 | ○ |
|  |  | ONE-SIDE BEAD(2) |  | 2.6 | 95.4 | 90 | ○ |

TABLE 9-continued

| TEST PIECE SYMBOL | CATEGORY | LENGTH OF STIFFENING BEAD OF LOWER PLATE (mm) | LENGTH OF STIFFENING BEAD OF UPPER PLATE (mm) | SUM OF LENGTHS OF STIFFENING BEADS (mm) | DISTANCE FROM FILLET BEAD START AND END EDGES (mm) | WIDTH $W_f$ OF FILLET BEAD (mm) | NECESSARY LENGTH OF STIFFENING BEAD (mm) | JUDGING LENGTH OF STIFFENING BEAD (SECOND CONDITION) |
|---|---|---|---|---|---|---|---|---|
| TP34 | COMPARISON | — | — | — | — | — | — | — |
| TP43 | INVENTION | 21 | — | 21 | 0 | 7.2 | 14.4 | ○ |
|  |  | 21 | — | 21 | 0 | 7.2 | 14.4 | ○ |
| TP44 | INVENTION | 16 | 5 | 21 | 10 | 7.5 | 15 | ○ |
|  |  | 16 | 5 | 21 | 10 | 7.5 | 15 | ○ |
| TP45 | INVENTION | 20 | — | 20 | 18 | 7.5 | 18 | ○ |
|  |  | 20 | — | 20 | 18 | 7.5 | 18 | ○ |
| TP46 | INVENTION | 18 | 15 | 33 | 0 | 7.6 | 15.2 | ○ |
|  |  | 25 | — | 25 | 30 | 7.6 | 30 | x |
|  |  | 25 | — | 25 | 30 | 7.6 | 30 | x |
|  |  | 18 | 15 | 33 | 0 | 7.6 | 15.2 | ○ |
| TP47 | COMPARISON | 18 | — | 18 | 20 | 7.5 | 20 | x |
|  |  | 18 | — | 18 | 20 | 7.5 | 20 | x |

TABLE 10

| TEST PIECE SYMBOL | CATEGORY | LENGTH OF STIFFENING BEAD WITH RESPECT TO FILLET BEAD (%) | SUM OF LENGTHS OF STIFFENING BEADS WITH RESPECT TO FILLET BEAD (%) | JUDGING LENGTH OF STIFFENING BEAD (FIRST CONDITION) | HEIGHT OF STIFFENING BEAD (mm) | RATIO OF HEIGHT OF STIFFENING BEAD TO PLATE THICKNESS | JUDGING HEIGHT OF STIFFENING BEAD | WIDTH OF STIFFENING BEAD (mm) |
|---|---|---|---|---|---|---|---|---|
| TP34 | COMPARISON | — | — | — | 1.8 | — | — | — |
| TP43 | INVENTION | 22 | 44 | x | 1.8 | 69 | ○ | 7.1 |
|  |  | 22 |  |  | 1.9 | 73 | ○ | 7.2 |
| TP44 | INVENTION | 22 | 44 | x | 1.7 | 65 | ○ | 6.9 |
|  |  | 22 |  |  | 1.9 | 73 | ○ | 7.2 |
| TP45 | INVENTION | 21 | 42 | x | 1.8 | 69 | ○ | 7.1 |
|  |  | 21 |  |  | 1.9 | 73 | ○ | 7.2 |
| TP46 | INVENTION | 35 | 122 | ○ | 1.8 | 69 | ○ | 3.7 |
|  |  | 26 |  |  | 1.6 | 62 | ○ | 3.5 |
|  |  | 26 |  |  | 1.7 | 65 | ○ | 3.5 |
|  |  | 35 |  |  | 1.5 | 58 | ○ | 3.8 |
| TP47 | COMPARISON | 19 | 38 | x | 1.8 | 69 | ○ | 7.1 |
|  |  | 19 |  |  | 1.9 | 73 | ○ | 7.2 |

| TEST PIECE SYMBOL | CATEGORY | RATIO OF BEAD WIDTH TO PLATE THICKNESS | JUDGING WIDTH OF STIFFENING BEAD | FATIGUE TEST LOAD (kN) | FATIGUE LIFE (TIMES) | FATIGUE LIFE IMPROVING PERCENTAGE (%) | TEST PIECE SYMBOL AS REFERENCE OF CALCULATING FATIGUE LIFE IMPROVING PERCENTAGE |
|---|---|---|---|---|---|---|---|
| TP34 | COMPARISON | — | — | 18 | 382000 | — | — |
| TP43 | INVENTION | 273 | ○ | 18 | 767820 | 201 | TP34 |
|  |  | 277 | ○ |  |  |  |  |
| TP44 | INVENTION | 265 | ○ | 18 | 721980 | 189 | TP34 |
|  |  | 277 | ○ |  |  |  |  |
| TP45 | INVENTION | 273 | ○ | 18 | 748720 | 196 | TP34 |
|  |  | 277 | ○ |  |  |  |  |
| TP46 | INVENTION | 142 | ○ | 18 | 1069600 | 280 | TP34 |
|  |  | 135 | ○ |  |  |  |  |
|  |  | 135 | ○ |  |  |  |  |
|  |  | 146 | ○ |  |  |  |  |
| TP47 | COMPARISON | 273 | ○ | 18 | 504240 | 132 | TP34 |
|  |  | 277 | ○ |  |  |  |  |

It should be noted that all of the above-described embodiments of the present invention merely illustrate examples of implementing the present invention, and the technical scope of the present invention is not to be construed in a restrictive manner by these embodiments. That is, the present invention may be implemented in various forms without departing from the technical spirit or main features thereof.

INDUSTRIAL APPLICABILITY

The present invention is highly applicable in machine industry as well as welding industry of metal members such as steel plates.

The invention claimed is:

1. A fillet arc welded joint formed by fillet arc welding a first metal member and a second metal member, the fillet arc welded joint comprising:
the first and second metal members each being substantially planar and comprising opposing first and second sides, the first metal member overlapping the first side of the second metal member and an end portion of the first metal member being fillet arc welded to a surface of the second metal member to form a fillet bead longitudinally extending along an edge of the end portion,
at least one stiffening bead formed by arc welding on the surface of the second metal member, wherein each stiffening bead longitudinally extends across the surface with the fillet bead being a starting point,
wherein each stiffening bead is formed to have an angle of 45° to 135° with respect to the fillet bead, and is formed to satisfy conditions (a1), (b), and (c) below:

Sum total $l$ of lengths of stiffening beads $\geq L \times 0.5$ (a1)

Height $h$ of the stiffening beads $\geq t/2$ (b)

Width $w$ of the stiffening beads $\geq 2.5t$ (c)

L: Length (mm) of the fillet bead
t: Thickness (mm) of the second metal member, and
wherein:
the fillet bead penetrates the first and second sides of the first metal member and is formed on only the first side of the second metal member, and does not penetrate the second side of the second metal member
the stiffening bead does not penetrate the second side of the second metal member,
the Height h of the stiffening bead refers to a distance in a height direction between the surface of the second metal member and a highest position of the stiffening bead formed on the second metal member, wherein the surface of the second metal member is an area where no stiffening bead is formed, and
the fillet bead and the stiffening bead are different weld beads.

2. The fillet arc welded joint according to claim 1, wherein a number n of the stiffening beads formed with respect to the fillet beads satisfies a condition (d) below:

$L/n \leq 50t$ (d)

L: Bead length (mm) of the fillet bead
t: Thickness (mm) of the metal member on which the stiffening bead is formed.

3. A fillet arc welded joint formed by fillet arc welding a first metal member and a second metal member, the fillet arc welded joint comprising:
the first and second metal members each being substantially planar and comprising opposing first and second sides, the first metal member overlapping the first side of the second metal member and an end portion of the first metal member being fillet arc welded to a surface of the second metal member to form a fillet bead longitudinally extending along an edge of the end portion,
at least one stiffening bead formed by arc welding on the surface of the second metal member, wherein each stiffening bead longitudinally extends across the surface with the fillet bead being a starting point,
wherein each stiffening bead is formed to have an angle of 45° to 135° with respect to the fillet bead within a range from a position of at least one of a start edge and an end edge of the fillet bead to a position separated therefrom by ¼ of a length of the fillet bead along a direction in which the fillet bead is formed, and is formed to satisfy conditions (a2), (b), and (c) below:

Length $l$ of one stiffening bead $\geq \max\{2 \times Wf, D\}$ (a2)

Height $h$ of the stiffening bead $\geq t/2$ (b)

Width $w$ of the stiffening bead $\geq 2.5t$ (c)

Wf: Width (mm) of the fillet bead
D: Distance (mm) between the stiffening bead and a position of an edge closer to each stiffening bead out of positions of the start edge and the end edge of the fillet bead
max{2×Wf, D}: Larger value out of 2×Wf and D
L: Length (mm) of the fillet bead
t: Thickness (mm) of the second metal member, and
wherein:
the fillet bead penetrates the first and second sides of the first metal member and is formed on only the first side of the second metal member, and does not penetrate the second side of the second metal member
the stiffening bead does not penetrate the second side of the second metal member,
the Height h of the stiffening bead refers to a distance in a height direction between the surface of the second metal member and a highest position of the stiffening bead formed on the second metal member, wherein the surface of the second metal member is an area where no stiffening bead is formed, and
the fillet bead and the stiffening bead are different weld beads.

4. The fillet arc welded joint according to claim 3, wherein a number n of the stiffening beads formed with respect to the fillet beads satisfies a condition (d) below:

$L/n \leq 50t$ (d)

L: Bead length (mm) of the fillet bead
t: Thickness (mm) of the metal member on which the stiffening bead is formed.

5. A method for forming a fillet arc welded joint by fillet arc welding a first metal member and a second metal member, the method comprising:
the first and second metal members each being substantially planar and comprising opposing first and second sides, the first metal member overlapping the first side of the second metal member,
forming a fillet bead longitudinally extending along an edge of an end portion of the first metal member by fillet arc welding the end portion to a surface of the second metal member,
forming at least one stiffening bead by arc welding on the surface of the second metal member, wherein each stiffening bead longitudinally extends across the surface with the fillet bead being a starting point, and forming each stiffening bead to have an angle of 45° to 135° with respect to the fillet bead, and to satisfy conditions (a1), (b), and (c) below:

Sum total $l$ of lengths of stiffening beads$\geq L \times 0.5$     (a1)

Height $h$ of the stiffening beads$\geq t/2$     (b)

Width $w$ of the stiffening beads$\geq 2.5t$     (c)

L: Length (mm) of the fillet bead
t: Thickness (mm) of the second metal member, and
wherein:
the fillet bead penetrates the first and second sides of the first metal member and is formed on only the first side of the second metal member, and does not penetrate the second side of the second metal member
the stiffening bead does not penetrate the second side of the second metal member,
the Height h of the stiffening bead refers to a distance in a height direction between the surface of the second metal member and a highest position of the stiffening bead formed on the second metal member, wherein the surface of the second metal member is an area where no stiffening bead is formed, and
the fillet bead and the stiffening bead are different weld beads.

6. A method for forming a fillet arc welded joint by fillet arc welding a first metal member and a second metal member, the method comprising:

the first and second metal members each being substantially planar and comprising opposing first and second sides, the first metal member overlapping the first side of the second metal member, forming a fillet bead longitudinally extending along an edge of an end portion of the first metal member by fillet arc welding the end portion to a surface of the second metal member, forming at least one stiffening bead by arc welding on the surface of the second metal member, wherein each stiffening bead longitudinally extends across the surface with the fillet bead being a starting point, and forming each stiffening bead to have an angle of 45° to 135° with respect to the fillet bead within a range from a position of at least one of a start edge and an end edge of the fillet bead to a position separated therefrom by ¼ of a length of the fillet bead along a direction in which the fillet bead is formed, and to satisfy conditions (a2), (b), and (c) below:

Length $l$ of one stiffening bead$\geq \max\{2 \times Wf, D\}$     (a2)

Height $h$ of the stiffening bead$\geq t/2$     (b)

Width $w$ of the stiffening bead$\geq 2.5t$     (c)

Wf: Width (mm) of the fillet bead
D: Distance (mm) between the stiffening bead and a position of an edge closer to each stiffening bead out of positions of the start edge and the end edge of the fillet bead
max{2×Wf, D}: Larger value out of 2×Wf and D
L: Length (mm) of the fillet bead
t: Thickness (mm) of the second metal member, and
wherein:
the fillet bead penetrates the first and second sides of the first metal member and is formed on only the first side of the second metal member, and does not penetrate the second side of the second metal member,
the stiffening bead does not penetrate the second side of the second metal member,
the Height h of the stiffening bead refers to a distance in a height direction between the surface of the second metal member and a highest position of the stiffening bead formed on the second metal member, wherein the surface of the second metal member is an area where no stiffening bead is formed, and
the fillet bead and the stiffening bead are different weld beads.

\* \* \* \* \*